United States Patent
Zhu et al.

(10) Patent No.: US 10,705,055 B2
(45) Date of Patent: Jul. 7, 2020

(54) MEASURING TRANSDUCER OF VIBRATION-TYPE AS WELL AS MEASURING SYSTEM FORMED THEREWITH

(71) Applicant: Endress + Hauser Flowtec AG, Reinach (DE)

(72) Inventors: Hao Zhu, Freising (DE); Alfred Rieder, Landshut (DE); Wolfgang Drahm, Erding (DE); Michael Kirst, Lorrach (DE)

(73) Assignee: ENDRESS + HAUSER FLOWTEC AG, Reinach (CH)

( * ) Notice: Subject to any disclaimer, the term of this patent is extended or adjusted under 35 U.S.C. 154(b) by 294 days.

(21) Appl. No.: 15/531,787

(22) PCT Filed: Nov. 3, 2015

(86) PCT No.: PCT/EP2015/075531
§ 371 (c)(1),
(2) Date: May 31, 2017

(87) PCT Pub. No.: WO2016/091478
PCT Pub. Date: Jun. 16, 2016

(65) Prior Publication Data
US 2017/0261474 A1    Sep. 14, 2017

(30) Foreign Application Priority Data

Dec. 10, 2014   (DE) .................. 10 2014 118 367

(51) Int. Cl.
*G01N 29/22*    (2006.01)
*G01F 1/84*    (2006.01)
(Continued)

(52) U.S. Cl.
CPC ......... *G01N 29/222* (2013.01); *G01F 1/8413* (2013.01); *G01F 1/8477* (2013.01);
(Continued)

(58) Field of Classification Search
CPC ... G01N 29/222; G01F 1/8413; G01F 1/8477; G01F 15/02; G01F 25/0007
(Continued)

(56) References Cited

U.S. PATENT DOCUMENTS

2010/0242623 A1*   9/2010   Bitto .................. G01F 1/8409
                                                       73/861.356
2012/0167697 A1*   7/2012   Rieder ................ G01F 1/8413
                                                       73/861.357
(Continued)

FOREIGN PATENT DOCUMENTS

CN    102667421 A    9/2012
CN    103459989 A    12/2013
(Continued)

OTHER PUBLICATIONS

European Search Report in corresponding European Application No. 15 788 419.8, dated Oct. 24, 2018.
(Continued)

*Primary Examiner* — Tarun Sinha
(74) *Attorney, Agent, or Firm* — Bacon & Thomas, PLLC

(57) ABSTRACT

A measuring transducer comprises two flow dividers having, in each case, two tubular chambers separated from one another and adapted for guiding in- and out flowing fluid, of which each has a chamber floor, in which are formed, in each case, two mutually spaced flow openings communicating with a lumen of the chamber, and as well as a tube arrangement having at least four measuring tubes connected to the flow dividers for guiding flowing fluid with parallel flow. Moreover, the measuring transducer comprises an
(Continued)

electromechanical exciter mechanism for exciting mechanical oscillations of the measuring tubes as well as a sensor arrangement for registering oscillatory movements of the measuring tubes and for generating at least two oscillation measurement signals representing oscillations of at least one of the measuring tubes. The measuring system includes besides the measuring transducer also transmitter electronics electrically connected therewith for activating the exciter mechanism and for processing at least one of the oscillation measurement signals generated by the sensor arrangement.

27 Claims, 15 Drawing Sheets

(51) Int. Cl.
  *G01F 25/00* (2006.01)
  *G01F 15/00* (2006.01)
  *G01N 9/00* (2006.01)
  *G01N 11/16* (2006.01)
  *G01N 29/02* (2006.01)

(52) U.S. Cl.
  CPC .......... *G01F 15/00* (2013.01); *G01F 25/0007* (2013.01); *G01N 9/002* (2013.01); *G01N 11/16* (2013.01); *G01N 29/02* (2013.01)

(58) Field of Classification Search
  USPC .......................................................... 73/579
  See application file for complete search history.

(56) References Cited

U.S. PATENT DOCUMENTS

| | | | |
|---|---|---|---|
| 2012/0178629 A1* | 7/2012 | Hudson | B01F 3/0807 504/363 |
| 2012/0255370 A1 | 10/2012 | Rieder et al. | |

FOREIGN PATENT DOCUMENTS

| | | |
|---|---|---|
| CN | 103562690 A | 2/2014 |
| CN | 103620351 A | 3/2014 |
| DE | 31 02 167 A1 | 12/1981 |
| DE | 102006002217 A1 | 12/2009 |
| DE | 102006039867 A1 | 3/2010 |
| DE | 102009001472 A1 | 9/2010 |
| DE | 102009055069 A1 | 6/2011 |
| DE | 102010039627 A1 | 2/2012 |
| DE | 102011010178 A1 | 8/2012 |
| DE | 102014118367 A1 | 6/2016 |
| EP | 2159552 A1 | 3/2010 |
| EP | 2485020 A1 | 8/2012 |
| FR | 2 475 649 A1 | 8/1981 |
| WO | WO2016091478 A1 | 6/2016 |

OTHER PUBLICATIONS

Chinese Office Action in corresponding Chinese Application No. 201580067831.3, dated Jan. 2, 2019.
German Search Report, German Patent Office, Munich, DE, dated Jul. 10, 2017.
International Search Report, EPO, The Netherlands, dated Jan. 25, 2016.
English Translation of the International Preliminary Report on Patentability, WIPO, Geneva, CH dated Nov. 3, 2015.

\* cited by examiner

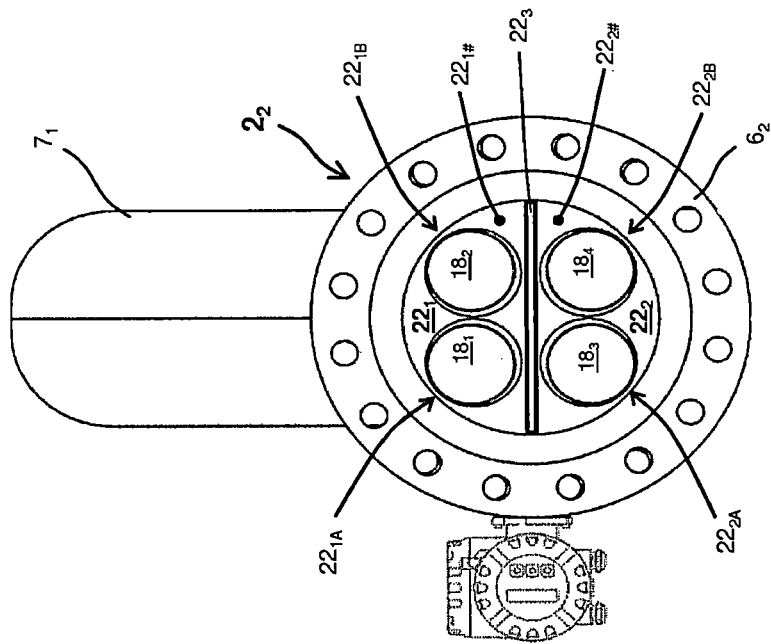
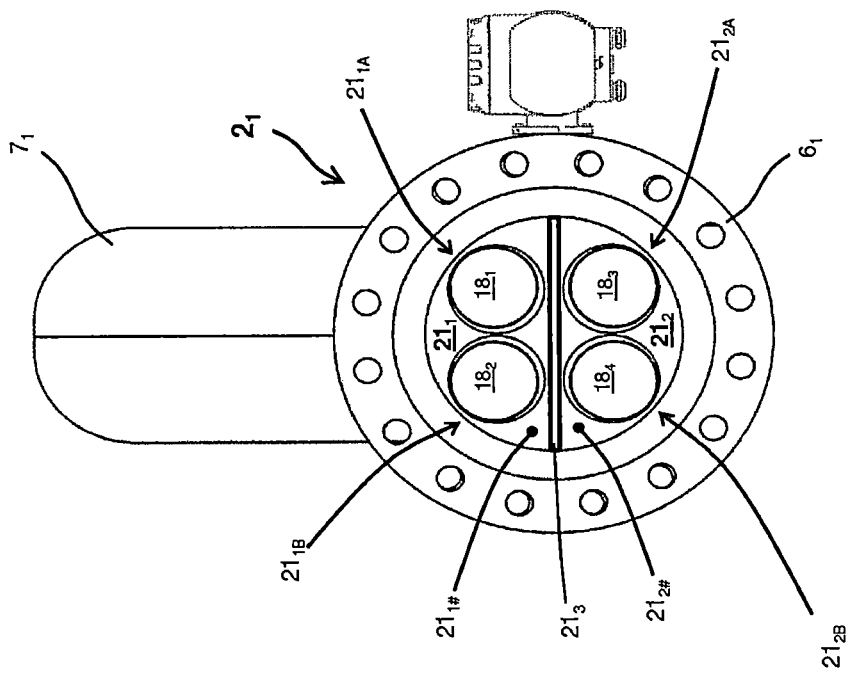
Fig. 10b
Fig. 10a

MEASURING TRANSDUCER OF VIBRATION-TYPE AS WELL AS MEASURING SYSTEM FORMED THEREWITH

TECHNICAL FIELD

The invention relates to a measuring transducer of the vibration-type useful for producing reaction forces for example, namely density dependent inertial forces and/or mass flow rate dependent Coriolis forces and/or viscosity dependent friction forces—thus forces dependent on at least one physical, measured variable—, for example, namely a density and/or a mass flow rate and/or a viscosity—of a fluid flowing in a pipeline. Additionally, the invention also relates to a measuring system formed by means of such a measuring transducer.

BACKGROUND DISCUSSION

Described in US-A 2012/0192658, US-A 2011/0146416, US-A 2011/0167907, US-A 2011/0265580, and US-A 2014/0000374 patents are measuring transducers of the vibration-type, which are adapted to produce reaction forces for example, namely density dependent inertial forces and/or mass flow rate dependent Coriolis forces and/or viscosity dependent friction forces—thus forces dependent on at least one physical, measured variable—, for example, namely a density and/or a mass flow rate and/or a viscosity—of a fluid flowing in a pipeline, or which are provided to be used as a component of a vibronic measuring device serving for measuring said measured variable. Each of the disclosed measuring transducers comprises a tube arrangement with four measuring tubes for conveying flowing fluid as well as two mutually spaced flow dividers having, in each case, a tubular chamber adapted for guiding in- and outflowing fluid. The measuring tubes are connected to each of the chambers for forming flow paths for parallel flow, wherein each of the chambers has a chamber floor, in which exactly four mutually spaced flow openings are formed communicating with a lumen of the chamber, and each of the four measuring tubes is connected with a respective inlet-side, first measuring tube end with one of the flow openings of the respective first flow divider, consequently communicates with its lumen and with a respective outlet-side, second measuring tube end with one of the flow openings of the respective second flow divider, consequently communicates with its lumen. The four measuring tubes are embodied, in each case, at least sectionally straight and/or at least sectionally bent, for example, in the form of a "U" or a "V", for example, also in such a manner that they are, such as shown in US-A 2011/0146416, in each case, straight over an entire measuring tube length. Additionally, the measuring tubes can be so formed and arranged that the tube arrangement has at least two imaginary symmetry planes perpendicular to one another, relative to which the tube arrangement is, in each case, mirror symmetric.

Each of the measuring transducers includes additionally, in each case, an electromechanical exciter mechanism serving for exciting mechanical oscillations of the measuring tubes as well as a sensor arrangement serving both for registering oscillatory movements of the measuring tubes as well as also for generating at least one oscillation measurement signal representing oscillations of the measuring tubes.

The above-mentioned two flow dividers of each of the measuring transducers can, in each case, also be an integral component of a transducer housing, namely a transducer housing having a cavity with tube—, exciter—as well as sensor arrangement placed therein, in such a manner that a first housing end of the transducer housing is formed by means of the first flow divider and a second housing end of the transducer housing is formed by means of the second flow divider and that the transducer housing has, laterally bounding the particular cavity, a side wall, which is affixed both to the first flow divider as well as also to the second flow divider.

Furthermore, each of the disclosed measuring transducers can, additionally, for the purpose of forming a vibronic measuring system, for example, in the form of an in-line-measuring device in compact construction, serving for measuring at least one measured variable, for example, namely one of the flow parameters, mass flow rate and volume flow rate or one of the substance parameters, density and viscosity, of a fluid flowing in a pipeline, in each case, additionally be electrically connected to an associated measuring—and operating electronics serving for operating the exciter mechanism as a well as for processing the at least one oscillation measurement signal delivered by the sensor arrangement, especially namely for ascertaining measured values for the at least one measured variable from the at least one oscillation measurement signal.

As discussed in the above mentioned US-A 2012/0192658, accuracy of measurement of such a measuring system formed by means of a measuring transducer of the above indicated type, namely accuracy with which the measured values generated by means of the measuring system for the at least one measured variable agree with the measured variable, can be optimized by selecting geometry and surface characteristics of the measuring tubes such that a flow resistance of all four measuring tubes is identical. Said condition is naturally fulfilled, also over a comparatively broad measuring or operating range, in the case of the tube arrangements disclosed in US-A 2011/0146416, US-A 2011/0167907, US-A 2011/0265580, and US-A 2014/0000374, namely, in each case, tube arrangements formed by means of four equally-constructed measuring tubes and being, in each case, mirror symmetrical relative to three imaginary, mutually orthogonal, symmetry planes. In the case of tube arrangements formed by means of four bent, for example, U-, respectively V-shaped, measuring tubes only pairwise equally-constructed, equally as well, in each case, mirror symmetrical relative to only two mutually orthogonal imaginary symmetry planes, again, flow resistances identical in the above-mentioned sense can be achieved according to the US-A 2012/0192658 for a certain operating or working point, in that all four measuring tubes have, in each case, equal surface characteristics and additionally are at least of equal measuring tube length and equal caliber.

Although use of four measuring tubes arranged and embodied according to one of the above-mentioned principles for certain measuring or operating ranges can achieve quite acceptable measurement accuracies, it has nevertheless been found that for certain applications considerably lessened measurement accuracies can be observed; this not least of all also in the case of applications, in which the at least one measured variable is to be ascertained for a fluid flowing with a comparatively high mass flow rate of some thousands of tons per hour and/or a fluid flowing with a strongly fluctuating Reynolds number, namely a Reynolds number changing over a wide range and/or very quickly with time, wherein a measuring system formed by means of a measuring transducer embodied according to US-A 2012/0192658 can have an accuracy of measurement tending to be fragile to a higher degree in comparison with measuring systems disclosed in US-A 2011/0146416, US-A 2011/0167907, US-A 2011/0265580, and US-A 2014/0000374.

SUMMARY OF THE INVENTION

Starting from the above indicated state of the art, especially its disadvantages, an object of the invention is to improve measuring transducers of the type being discussed such that measuring system formed therewith can have a sufficiently high accuracy of measurement even in the case of high mass flow rates and/or strongly fluctuating Reynolds number.

For achieving the object, the invention resides in a measuring transducer of the vibration-type for producing reaction forces (for example, namely density dependent, inertial forces and/or mass flow rate dependent, Coriolis forces and/or viscosity dependent, friction forces) dependent, on at least one physical, measured variable for example, namely a density and/or a mass flow rate and/or a viscosity of a fluid flowing in a pipeline. The measuring transducer of the invention comprises:

- a first flow divider having two tubular chambers separated from one another for example, by a single partition for guiding in- and out flowing fluid, of which a first chamber has a chamber floor, in which are formed two, for example, exactly two, mutually spaced flow openings, for example, equally constructed flow openings, communicating with a lumen of the first chamber, and a second chamber has a chamber floor, in which are formed two, for example, exactly two, mutually spaced flow openings, for example, equally constructed flow openings, communicating with a lumen of the second chamber;
- a second flow divider, for example, one equally-constructed to the first flow divider, having two tubular chambers separated from one another—for example, by a single partition—for guiding in- and out flowing fluid, of which a first chamber has a chamber floor, in which are formed two, for example, exactly two, mutually spaced flow openings, for example, equally constructed flow openings, communicating with a lumen of the first chamber, and a second chamber has a chamber floor, in which are formed two, for example, exactly two, mutually spaced flow openings, for example, equally constructed flow openings, communicating with a lumen of the second chamber;
- a tube arrangement having at least four measuring tubes connected to the flow dividers (for example, equally-constructed flow dividers) for parallel flow, —, for example, measuring tubes, which are at least pairwise equally-constructed and/or at least pairwise mutually parallel and/or at least sectionally parallel and/or at least, in each case, sectionally bent and/or, in each case, monolithic—for guiding flowing fluid, of which a first measuring tube communicates with an inlet-side, first measuring tube end with a first flow opening of the first chamber of the first flow divider and with an outlet-side, second measuring tube end with a first flow opening of the first chamber of the second flow divider, a second measuring tube—for example, a second measuring tube at least sectionally parallel to the first measuring tube—communicates with an inlet-side, first measuring tube end with a second flow opening of the first chamber of the first flow divider and with an outlet-side, second measuring tube end with a second flow opening of the first chamber of the second flow divider, a third measuring tube communicates with an inlet-side, first measuring tube end with a first flow opening of the second chamber of the first flow divider and with an outlet-side, second measuring tube end with a first flow opening of the second chamber of the second flow divider, and a fourth measuring tube —, for example, a fourth measuring tube at least sectionally parallel to the third measuring tube communicates with an inlet-side, first measuring tube end with a second flow opening of the second chamber of the first flow divider and with an outlet-side, second measuring tube end with a second flow opening of the second chamber of the second flow divider;
- an electromechanical exciter mechanism for exciting mechanical oscillations of the measuring tubes;
- as well as a sensor arrangement for registering oscillatory movements of the measuring tubes and for generating both a first oscillation measurement signal representing oscillations of at least one of the measuring tubes, for example, a first oscillation measurement signal having a signal frequency dependent on a density of a fluid guided in the tube arrangement, as well as also at least a second oscillation measurement signal representing oscillations of at least one of the measuring tubes, for example, a second oscillation measurement signal having a signal frequency dependent on a density of a fluid guided in the tube arrangement and/or a second oscillation measurement signal phase-shifted by a phase difference relative to the first oscillation measurement signal dependent on a mass flow rate of a fluid flowing through the tube arrangement.

Moreover, the invention resides also in a measuring system comprising such a measuring transducer and serving for measuring at least one physical, measured variable—for example, namely a density and/or a mass flow rate and/or a viscosity—of a fluid flowing in a pipeline, for example, namely a fluid in the form of a liquid, a gas or a dispersion. The measuring system comprises besides the measuring transducer also a transmitter electronics electrically connected with the measuring transducer for activating the exciter mechanism of the measuring transducer and for processing at least one of the oscillation measurement signals generated by the sensor arrangement of the measuring transducer, for example, namely for ascertaining measured values representing the at least one measured variable.

In a first embodiment of the invention, it is, furthermore, provided that the exciter mechanism has a first oscillation exciter, which is adapted to excite both mechanical oscillations of the first measuring tube as well as also mechanical oscillations of the second measuring tube, for example, differentially and/or simultaneously, for example, in such a manner that the oscillations of the second measuring tube are opposite-equal to the oscillations of the first measuring tube. Developing this embodiment of the invention further, it is, additionally, provided that the exciter mechanism has a second oscillation exciter (for example, one equally-constructed to the first oscillation exciter), which is adapted to excite both mechanical oscillations of the third measuring tube as well as also mechanical oscillations of the fourth measuring tube, for example, differentially and/or simultaneously, for example, in such a manner that the oscillations of the fourth measuring tube are opposite-equal to the oscillations of the third measuring tube and/or that the oscillations of the third and fourth measuring tubes excited by means of the second oscillation exciter are independent of the oscillations of the first and second measuring tubes excited by means of the first oscillation exciter.

In a second embodiment of the invention, it is, furthermore, provided that the first flow divider has a flange for connecting the measuring transducer to a first pipe segment of a pipeline, for example, a first pipe segment serving for supplying fluid to the measuring transducer, and that the second flow divider has a flange for connecting the measuring transducer to a second tube segment of the pipeline, for example, a second tube segment serving for removing fluid from the measuring transducer.

In a third embodiment of the invention, it is, furthermore, provided that the flow openings formed in the chamber floor of the first chamber of the first flow divider and the flow openings formed in the chamber floor of the second chamber of the first flow divider are so arranged that a minimum separation between the flow openings formed in the chamber floor of the first chamber of the first flow divider equals a minimum separation between the flow openings formed in the chamber floor of the second chamber of the first flow divider.

In a fourth embodiment of the invention, it is, furthermore, provided that the flow openings formed in the chamber floor of the first chamber of the first flow divider and the flow openings formed in the chamber floor of the second chamber of the first flow divider are so arranged that a minimum separation between the first flow opening formed in the chamber floor of the first chamber of the first flow divider and the first flow opening formed in the chamber floor of the second chamber of the first flow divider equals a minimum separation between the second flow opening formed in the chamber floor of the first chamber of the first flow divider and the second flow opening formed in the chamber floor of the second chamber of the first flow divider.

In a fifth embodiment of the invention, it is, furthermore, provided that the flow openings formed in the chamber floor of the first chamber of the second flow divider and the flow openings formed in the chamber floor of the second chamber of the second flow divider are so arranged that a minimum separation between the flow openings formed in the chamber floor of the first chamber of the second flow divider equals a minimum separation between the flow openings formed in the chamber floor of the second chamber of the second flow divider.

In a sixth embodiment of the invention, is furthermore, provided that a minimum separation between the first flow opening formed in the chamber floor of the first chamber of the second flow divider and the first flow opening formed in the chamber floor of the second chamber of the second flow divider equals a minimum separation between the second flow opening formed in the chamber floor of the first chamber of the second flow divider and the second flow opening formed in the chamber floor of the second chamber of the second flow divider.

In a seventh embodiment of the invention, it is, furthermore, provided that the first flow divider comprises a connection nozzle—for example, a tubular and/or hollow cylindrical connection nozzle—extending from a truncated end—for example, an annular—proximal truncated end, namely one bordering both on an outer edge zone—for example, a circular arc like edge zone—of the chamber floor of the associated first chamber as well as also on an outer edge zone—for example, a circular arc like edge zone—of the chamber floor of the associated second chamber, to a truncated end—for example, annular—distal truncated end, remote namely both from the chamber floor of the associated first chamber as well as also from the chamber floor of the associated second chamber, as well as a partition—for example, a plate-shaped partition—arranged within a lumen of the connection nozzle, extending from a proximal partition end, namely one bordering both on an inner edge zone of the chamber floor of the associated first chamber as well as also on an inner edge zone of the chamber floor of the associated second chamber to a distal partition end, namely one remote both from the chamber floor of the first chamber as well as also from the chamber floor of the second chamber, and having a first lateral edge contacting the connection nozzle and a second lateral edge contacting the connection nozzle. Developing this embodiment of the invention further, it is, additionally, provided that the first chamber of the first flow divider is bounded laterally by the partition as well as by a first segment of the connection nozzle extending between the first lateral edge of the partition and the second lateral edge of the partition and that the second chamber of the first flow divider is bounded laterally by the partition as well as by a second segment of the connection nozzle extending between the first lateral edge of the partition and the second lateral edge of the partition and/or that the partition of the first flow divider is at least sectionally warped, for example, in such a manner that a surface facing the first chamber of the first flow divider is convex and a surface facing the second chamber of the first flow divider is concave.

In an eighth embodiment of the invention, it is, furthermore, provided that the second flow divider comprises a connection nozzle—for example, a tubular and/or hollow cylindrical connection nozzle—extending from a truncated end—for example, an annular—proximal truncated end, namely one bordering both on an outer edge zone—for example, a circular arc like edge zone—of the chamber floor of the associated first chamber as well as also on an outer edge zone—for example, a circular arc like edge zone—of the chamber floor of the associated second chamber to a truncated end—for example, an annular—distal truncated end, remote namely both from the chamber floor of the associated first chamber as well as also from the chamber floor of the associated second chamber, as well as a partition—for example, a plate-shaped partition—arranged within a lumen of the connection nozzle, extending from a proximal partition end, namely one bordering both on an inner edge zone of the chamber floor of the associated first chamber as well as also on an inner edge zone of the chamber floor of the associated second chamber, to a distal partition end, namely one remote both from the chamber floor of the first chamber as well as also from the chamber floor of the second chamber, and having a first lateral edge contacting the connection nozzle and a second lateral edge contacting the connection nozzle. Developing this embodiment of the invention further, it is, additionally, provided that the first chamber of the second flow divider is bounded laterally by the partition as well as by a first segment of the connection nozzle extending between the first lateral edge of the partition and the second lateral edge of the partition and that the second chamber of the second flow divider is bounded laterally by the partition as well as by a second segment of the connection nozzle extending between the first lateral edge of the partition and the second lateral edge of the partition and/or that the partition of the second flow divider is at least sectionally warped, for example, in such a manner that a surface facing the first chamber of the second flow divider is convex and a surface facing the second chamber of the second flow divider is concave.

In a ninth embodiment of the invention, it is, furthermore, provided that the first chamber of the first flow divider is of equal construction with at least one chamber of the second flow divider.

In a tenth embodiment of the invention, it is, furthermore, provided that the second chamber of the first flow divider is of equal construction with at least one chamber of the second flow divider.

In an 11$^{th}$ embodiment of the invention, it is, furthermore, provided that the first chamber of the first flow divider is of equal construction with only one chamber of the second flow divider.

In a twelfth embodiment of the invention, it is, furthermore, provided that the second chamber of the first flow divider is of equal construction with only one chamber of the second flow divider.

In a 13$^{th}$ embodiment of the invention, it is, furthermore, provided that the first chamber of the first flow divider is at least sectionally hollow cylindrical, for example, in such a manner that the lumen of the chamber has a plurality of imaginary cross sectional areas lying behind one another, equally as well mutually parallel and/or similar, imaginary cross sectional areas, having, in each case, a circular segment shaped silhouette.

In a 14$^{th}$ embodiment of the invention, it is, furthermore, provided that the second chamber of the first flow divider is at least sectionally hollow cylindrical, for example, in such a manner that the lumen of the chamber has a plurality of imaginary cross sectional areas lying behind one another, equally as well mutually parallel and/or similar, imaginary cross sectional areas, having, in each case, a circular segment shaped silhouette.

In a 15$^{th}$ embodiment of the invention, it is, furthermore, provided that the first chamber of the second flow divider is at least sectionally hollow cylindrical, for example, in such a manner that the lumen of the chamber has a plurality of imaginary cross sectional areas lying behind one another, equally as well mutually parallel and/or similar, imaginary cross sectional areas, having, in each case, a circular segment shaped silhouette.

In a 16$^{th}$ embodiment of the invention, it is, furthermore, provided that the second chamber of the second flow divider is at least sectionally hollow cylindrical, for example, in such a manner that the lumen of the chamber has a plurality of imaginary cross sectional areas lying behind one another, equally as well mutually parallel and/or similar, imaginary cross sectional areas, having, in each case, a circular segment shaped silhouette.

In a 17$^{th}$ embodiment of the invention, it is, furthermore, provided that each of the four measuring tubes is at least sectionally straight.

In an 18$^{th}$ embodiment of the invention, it is, furthermore, provided that each of the four measuring tubes is at least sectionally bent, for example, in U-shape or V-shape.

In a 19$^{th}$ embodiment of the invention, it is, furthermore, provided that the tube arrangement has at least two mutually perpendicular, imaginary symmetry planes, relative to which the tube arrangement is, in each case, mirror symmetric.

In a 20$^{th}$ embodiment of the invention, it is, furthermore, provided that the tube arrangement has two imaginary tube planes, for example, mutually parallel, imaginary tube planes, of which a first imaginary tube plane imaginarily cuts both the first measuring tube as well as also the third measuring tube lengthwise and a second imaginary tube plane imaginarily cuts both the second measuring tube as well as also the fourth measuring tube lengthwise, for example, in such a manner that the first imaginary tube plane imaginarily halves both the first measuring tube as well as also the third measuring tube and/or that the second imaginary tube plane imaginarily halves both the third measuring tube as well as also the fourth measuring tube.

In a 21$^{st}$ embodiment of the invention, it is, furthermore, provided that the measuring tubes, for example, in each case, V-shaped, measuring tubes, are only pairwise of equal construction, for example, in such a manner that the first measuring tube is only of equal construction to the second measuring tube and the third measuring tube is only of equal construction to the fourth measuring tube, and/or that a measuring tube length of the first measuring tube only equals a measuring tube length of the second measuring tube and a measuring tube length of the third measuring tube only equals a measuring tube length of the fourth measuring tube and/or that a caliber of the first measuring tube only equals a caliber of the second measuring tube and a caliber of the third measuring tube only equals a caliber of the fourth measuring tube.

In a 22$^{nd}$ embodiment of the invention, it is, furthermore, provided that a caliber of the first measuring tube equals a caliber of the second measuring tube and a caliber of the third measuring tube equals a caliber of the fourth measuring tube, for example, in such a manner that the caliber of the first measuring tube also equals the caliber of the third measuring tube, and the caliber of the second measuring tube also equals the caliber of the fourth measuring tube.

In a 23$^{rd}$ embodiment of the invention, it is, furthermore, provided that each of the measuring tubes, for example, in each case, V-shaped, measuring tubes, has, in each case, at least one bent tube segment—for example, in each case, a circular arc shaped and/or middle, bent tube segment, namely, in each case, a bent tube segment forming a center of the respective measuring tube. Developing this embodiment of the invention further, it is, additionally, provided that the measuring tubes are so formed and arranged that the at least one bent tube segment of each of the measuring tubes, for example, in each case, V-shaped, measuring tubes, is, in each case, parallel to the at least one bent tube segment of each of the other measuring tubes.

In a 24$^{th}$ embodiment of the invention, it is, furthermore, provided that each of the measuring tubes is V-shaped and that the measuring tubes are so arranged that the tube arrangement has a V-shaped silhouette.

In a 25$^{th}$ embodiment of the invention, it is, furthermore, provided that each of the measuring tubes, for example, in each case, V-shaped, measuring tubes, has, in each case, three bent tube segments, for example, in each case, circular arc shaped, bent tube segments, for example, in such a manner that two, in each case, adjoining bent tube segments of the respective measuring tube are, in each case, connected with one another via a straight tube segment of the measuring tube located therebetween. Developing this embodiment of the invention further, it is, additionally, provided that the measuring tubes are so formed and arranged that each of the three bent tube segments of each of the measuring tubes is, in each case, parallel to one of the three bent tube segments of each of the other measuring tubes.

In a further development of the invention, the measuring transducer further comprises a transducer housing, for example, an at least partially hollow cylindrical, transducer housing, of which a first housing end is formed by means of the first flow divider and a second housing end is formed by means of the second flow divider, wherein the transducer-housing has a cavity, within which the tube arrangement, the exciter mechanism as well as the sensor arrangement are placed. Both the first flow divider as well as also the second flow divider can, for example, additionally, in each case, be an integral component of the transducer housing, for example, namely in such a manner that the transducer housing has a side wall laterally bounding the cavity and affixed both to the first flow divider as well as also to the second flow divider, especially connected by material bonding both with the first flow divider as well as also with the second flow divider.

A basic idea of the invention is not, such as usual in the case of conventional measuring transducers of the type being discussed, to divide a flow supplied to a measuring transducer on the inlet side abruptly to the flow paths formed by means of the four measuring tubes, respectively to bring back together the four so formed flow portions on the outlet side equally abruptly, but, instead, to spread this out at two serially connected division-, respectively joining stages, in order to achieve thereby an improved conditioning of the flow within the measuring transducer, namely an as uniform as possible, respectively as little as possible transiently fluctuating, dividing of the flow to the flow paths formed by means of the four measuring tubes. A further advantage of the invention is, additionally, also that thereby a pressure loss caused by the measuring transducer, measured, respectively calculated, for example, according to the known Darcy-Weisbach equation, as a pressure difference between an input pressure reigning in the flow before the first flow divider and an output pressure reigning in the flow after the second flow divider, can additionally be lessened.

The invention as well as other advantageous embodiments thereof will now be explained in greater detail based on examples of embodiments, which are shown in the figures of the drawing. Equal parts are provided in all figures with equal reference characters; when perspicuity requires or it otherwise appears sensible, already mentioned reference characters are omitted in subsequent figures. Other advantageous embodiments or further developments, especially also combinations of, first of all, only individually explained aspects of the invention, result, furthermore, from the figures of the drawing, as well as also from the dependent claims per se.

BRIEF DESCRIPTION OF THE DRAWINGS

The figures of the drawing show as follows:

FIG. 10a, 10b shows a measuring system of FIG. 9 in first, respectively second, planar end views;

DETAILED DISCUSSION IN CONJUNCTION WITH THE DRAWINGS

Figure 1:
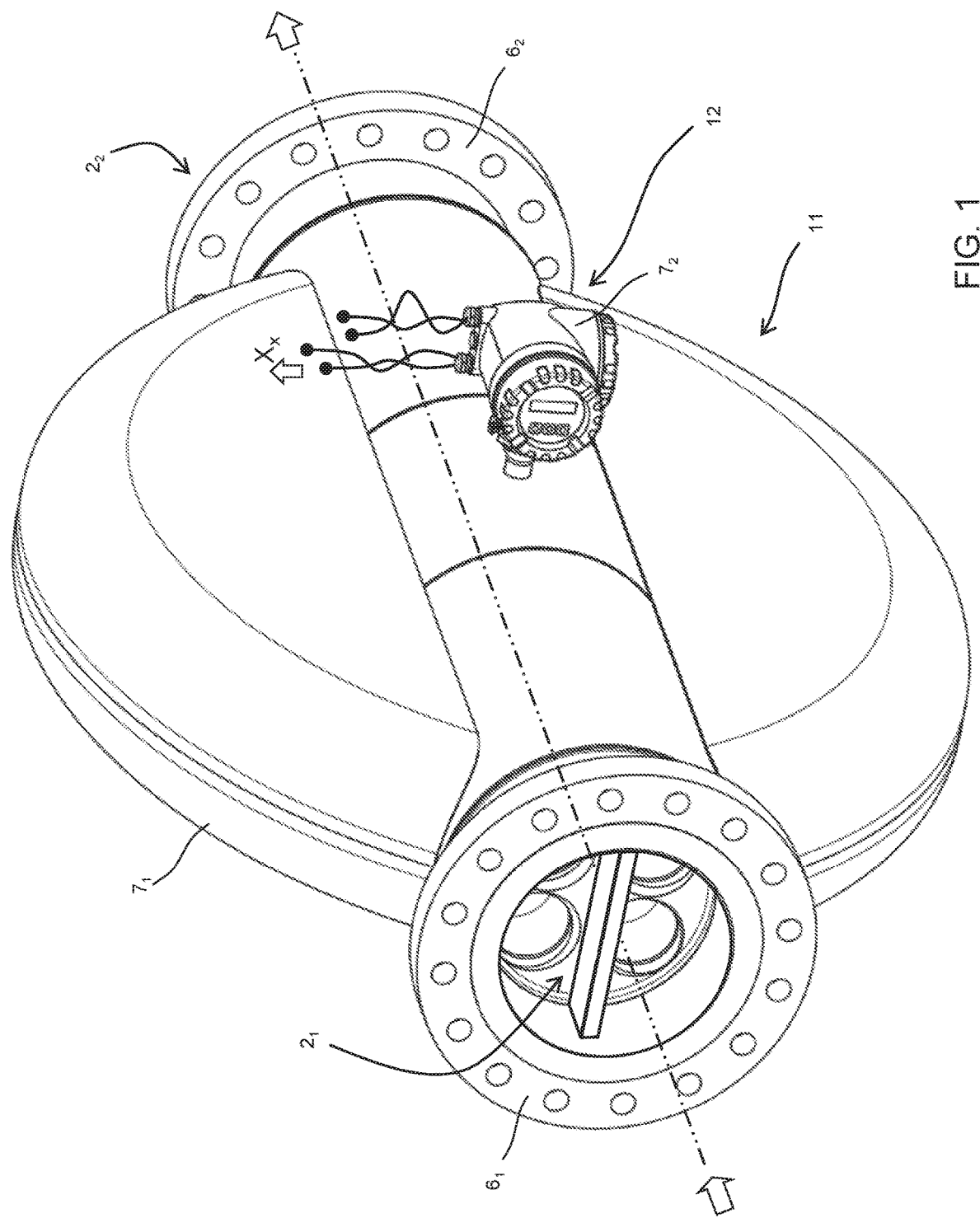
FIG. 1 is in perspective side view, a variant of a vibronic measuring system, for example, one embodied as a Coriolis mass flow- and/or density measuring device, for measuring at least one measured variable of a flowing fluid.
Figure 9:
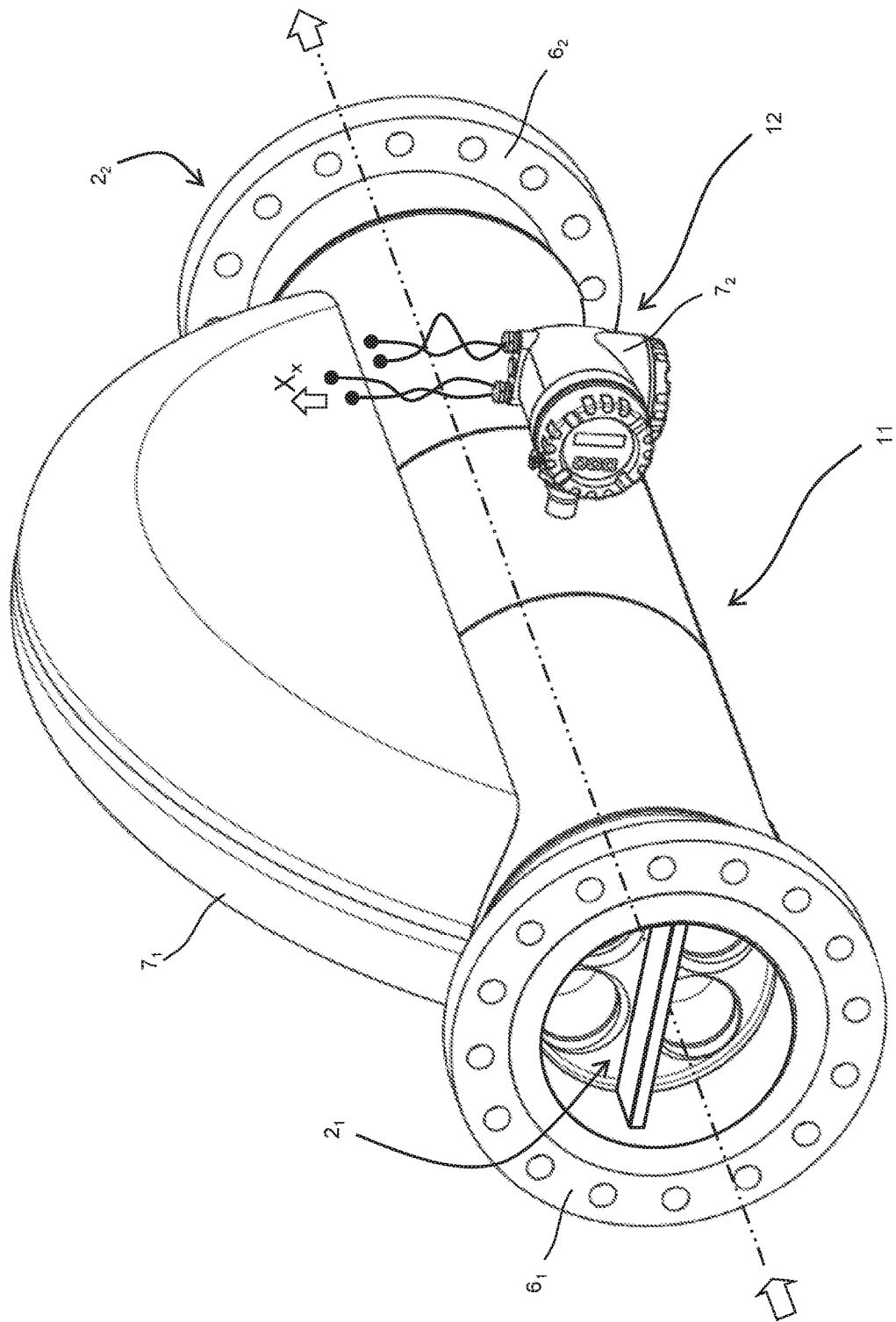
FIG. 9 shows in a perspective side view, another variant of a vibronic measuring system, for example, embodied as a Coriolis mass flow—and/or density measuring device, for measuring at least one measured variable of a flowing fluid.
Figure 13:
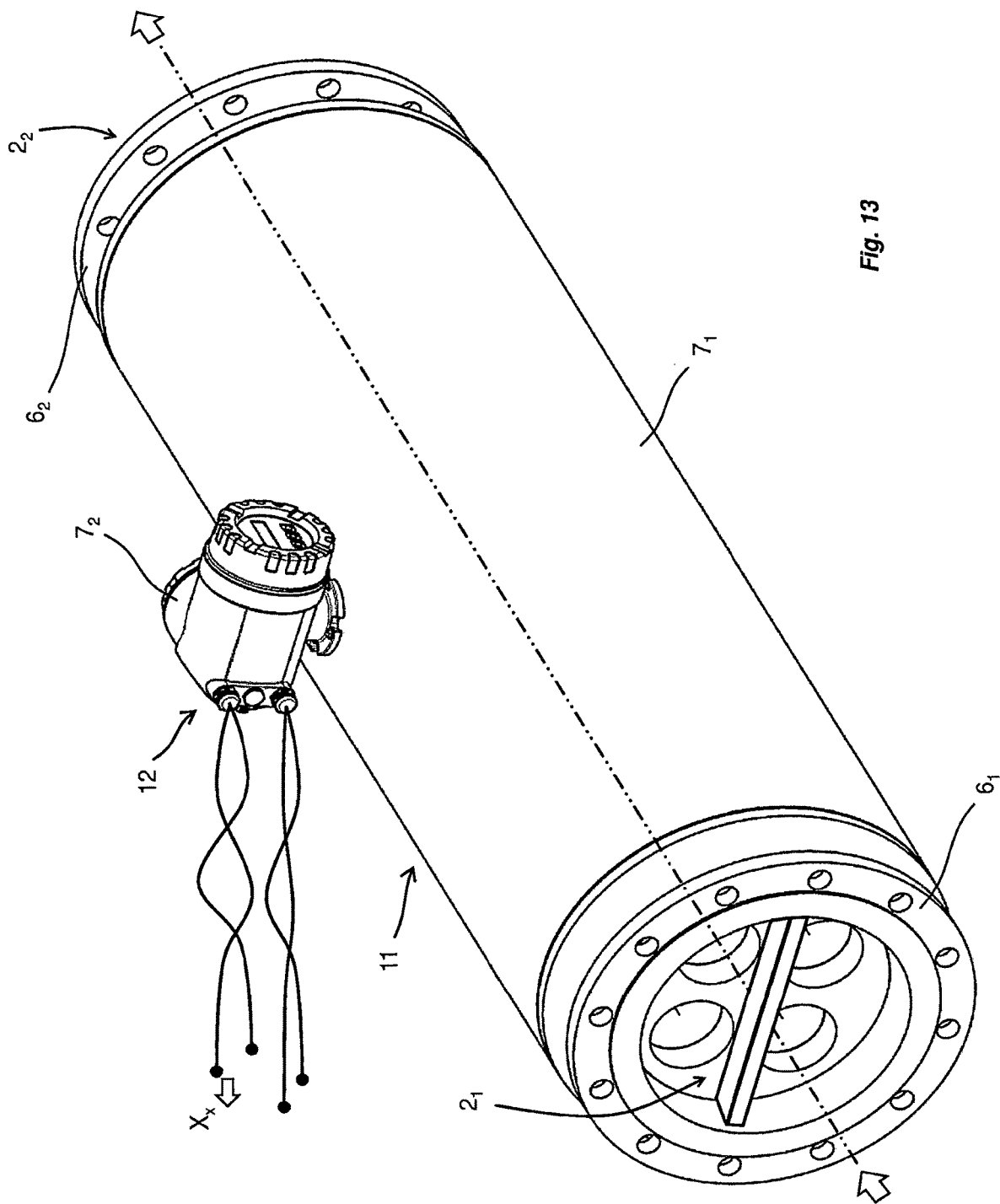
FIG. 13 shows in a perspective side view, another variant of a vibronic measuring system, for example, embodied as a Coriolis mass flow—and/or density measuring device, for measuring at least one measured variable of a flowing fluid.
Figure 14B:
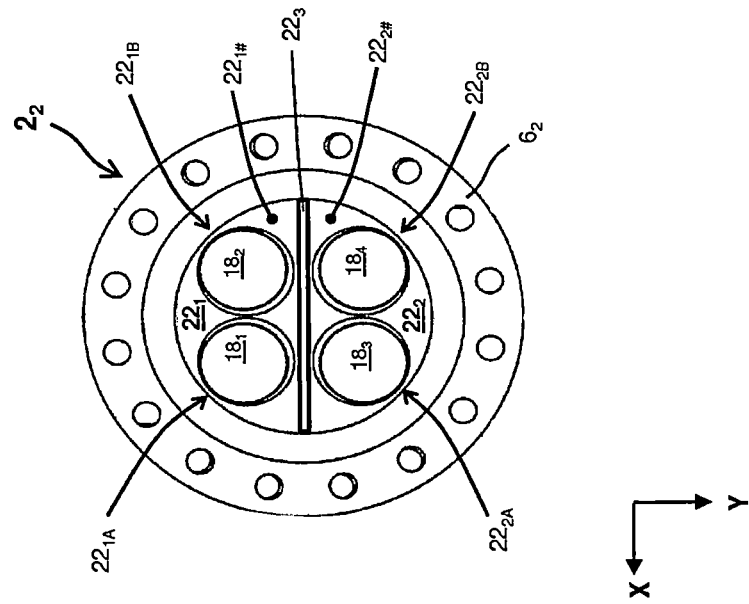
FIG. 14a, 14b shows a measuring system of FIG. 13 in first, respectively second, planar end views.
Figure 14A:
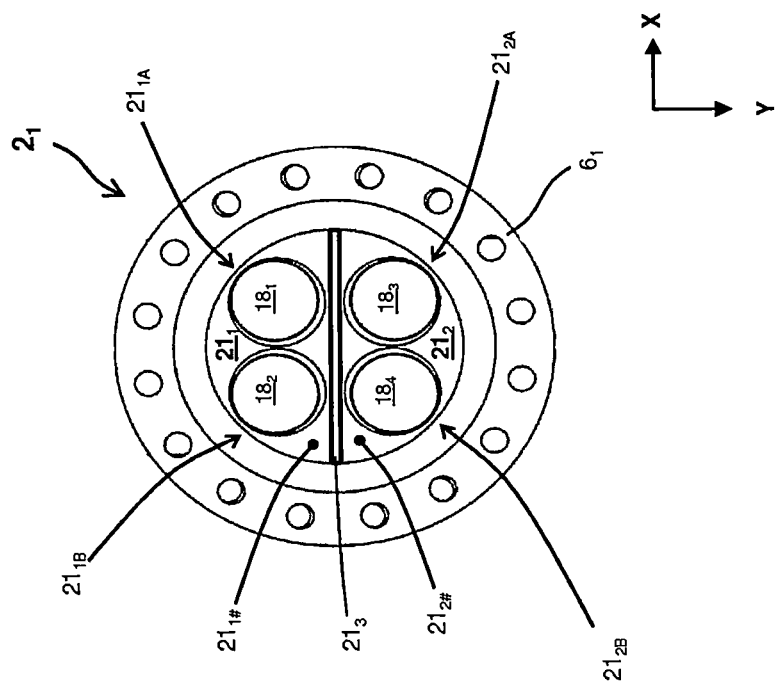

FIGS. 1, 9 and 13 show schematically, by way of example, vibronic measuring systems embodied, for example, as Coriolis, mass flow- and/or density measuring devices, for measuring at least one physical, measured variable x of a fluid flowing in a pipeline (not shown). The fluid can, in such case, be practically any flowable measured material, for example, namely a fluid in the form of a liquid, a gas or a dispersion. Especially, each of the measuring systems serves, in each case, to measure, as at least one measured variable, a mass flow rate $\dot{m}$ of a fluid flowing in the pipeline, especially namely to register and to represent such in mass flow, measured values $X_m$, for example, digital, mass flow, measured values $X_m$, representing the mass flow rate $\dot{m}$ and to output such as valid measured values $X_x$ ($X_m \rightarrow X_x$) of the measuring system. Alternatively or supplementally, the particular measuring system can, in given cases, also be used to measure a density $\rho$ and/or a viscosity $\eta$ of such fluids, consequently correspondingly, in given cases, also to generate digital density measured values $X_\rho$, or viscosity measured values $X_\eta$ and, in given cases, also to output such as valid measured values of the measuring system ($X_\rho \rightarrow X_x$; $X_\eta \rightarrow X_x$). Especially, the measuring system is, furthermore, provided to measure fluids, such as e.g. petroleum, natural gas or other petrochemical measured materials, which flow in a pipeline having a caliber of greater than 250 mm and/or a mass flow rate of greater than 1000 t/h.

Figure 11:
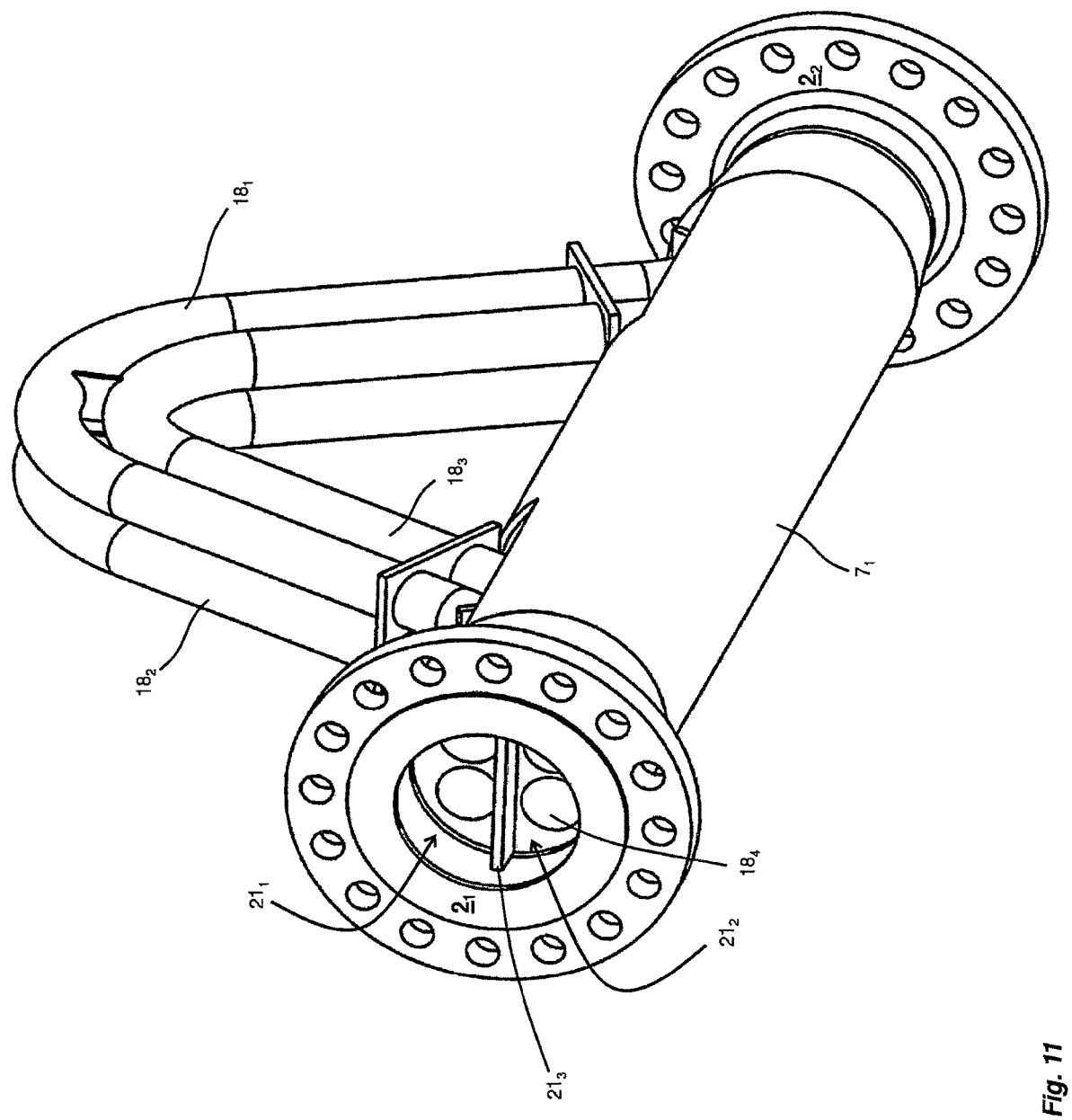
FIG. 11 shows in a first perspective side view, a measuring transducer of vibration-type suitable for a measuring system of FIG. 9.
Figures 12A, 12B:
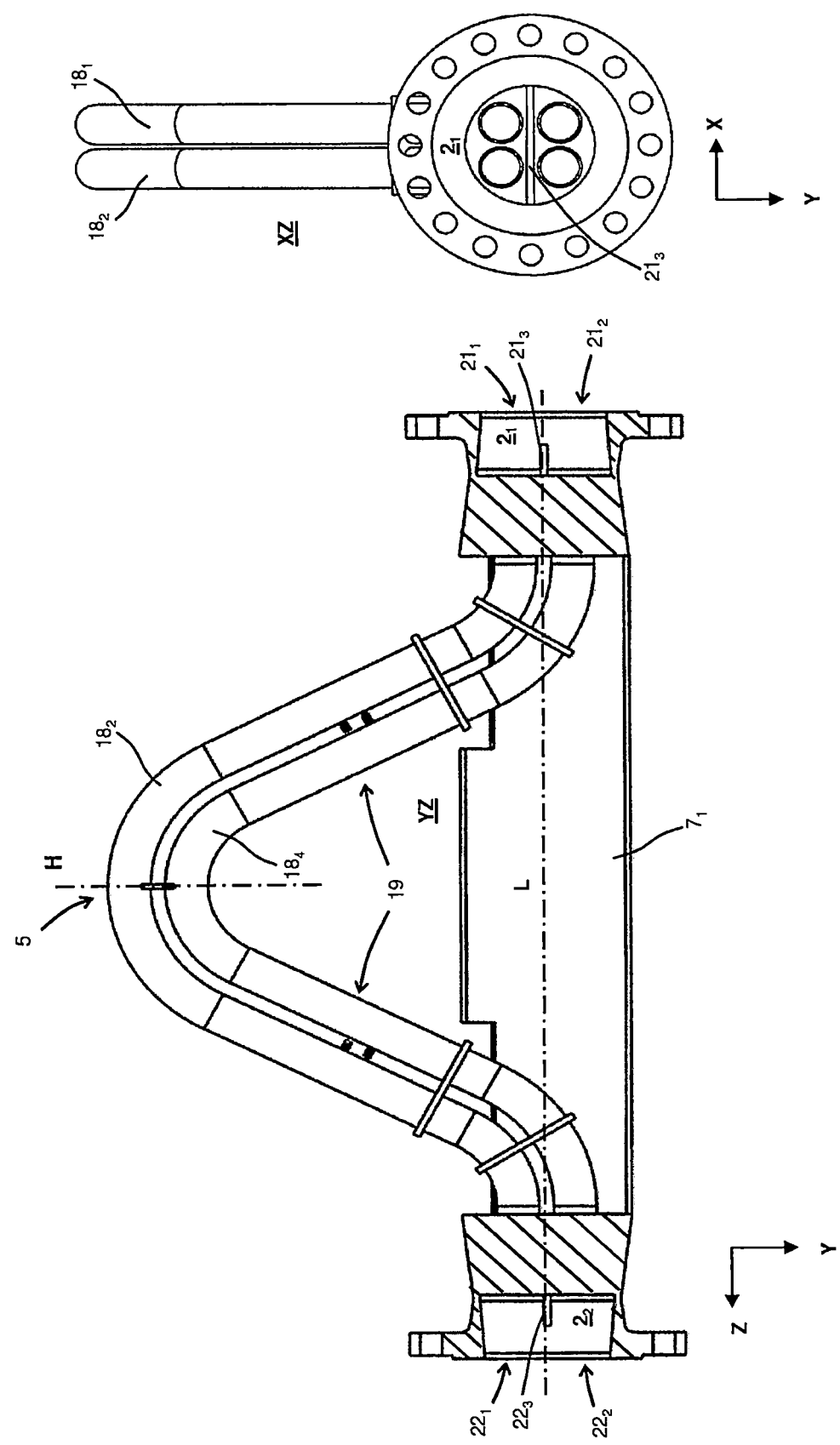
FIG. 12a, 12b shows partially sectioned, the measuring transducer of FIG. 11 in first, respectively second, planar side and end views.
Figure 15:
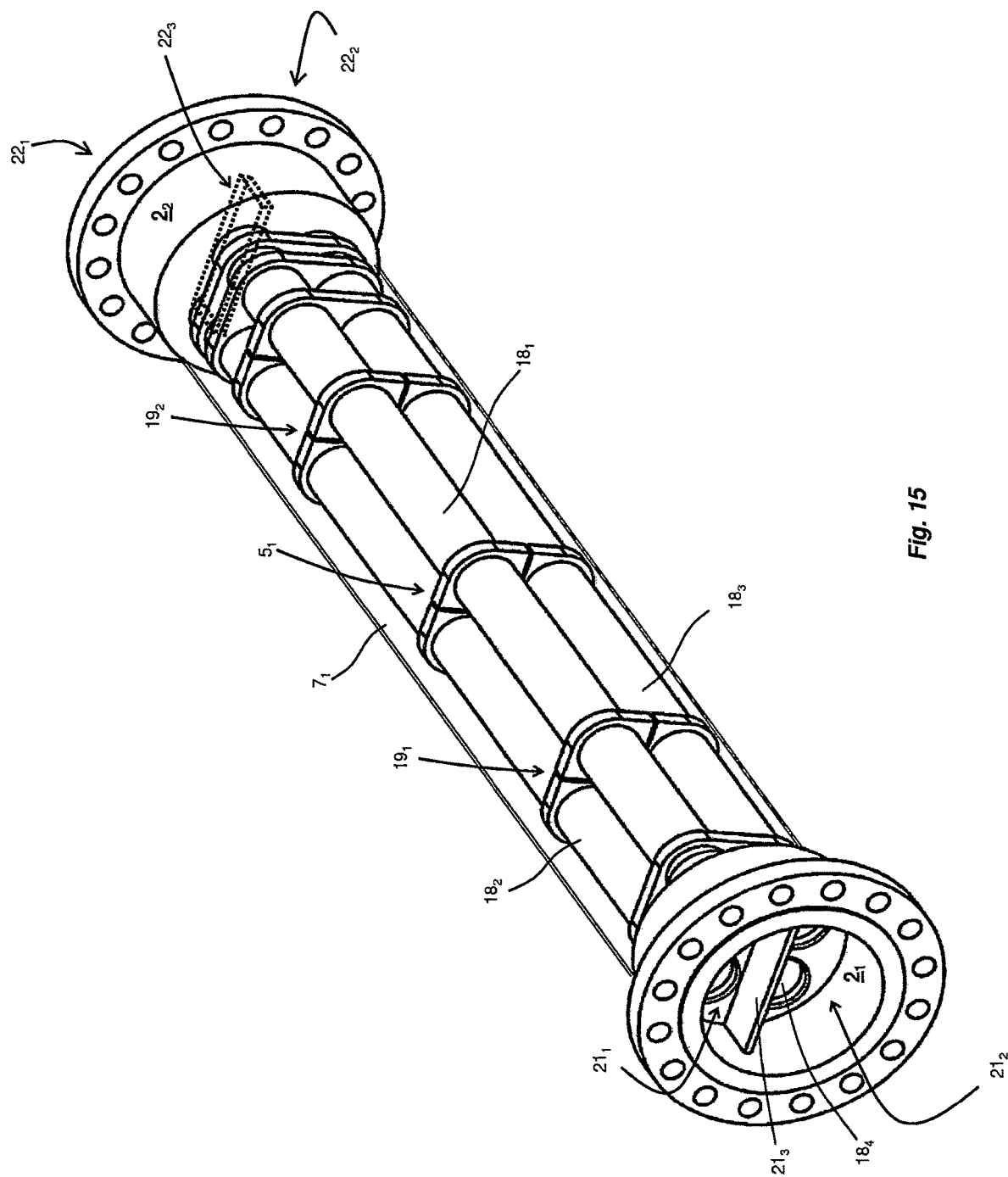
FIG. 15 shows in a first perspective side view, a measuring transducer of vibration-type suitable for a measuring system of FIG. 13.

Each of the measuring systems comprises a measuring transducer 11 of vibration-type, of which representative variants are shown in FIGS. 2, 3a, 3b, 4, 5 and 6, in FIGS. 11 and 12a and 12b, and in FIG. 15. Measuring transducer 11 is, in each case, adapted, during operation, both to be flowed through by fluid to be measured as well as also to deliver measurement signals—embodied as oscillation measurement signals—dependent on the at least one measured variable, especially in such a manner that the measurement signals have at least one signal parameter (for example, a signal amplitude, a signal frequency and/or a phase angle), which follows change of the at least one measured variable as a function of time with a corresponding change. The measuring transducer is, especially, provided and adapted to be inserted into the course of the pipeline flowed-through during operation by the fluid to be measured, and to be flowed-through by the fluid. Furthermore, the measuring transducer serves to produce in the through flowing fluid such mechanical reaction forces—for example, namely Coriolis forces dependent on the mass flow rate $\dot{m}$, inertial forces dependent on the density ρ of the fluid and/or frictional forces dependent on the viscosity η of the fluids—, forces registerable by sensor and, consequently, reacting measurably on the measuring transducer, in such a manner that at least one signal parameter of at least one of the measurement signals has a (numerical) parameter value corresponding to an instantaneous (numerical) value of the at least one measured variable.

Figure 2:
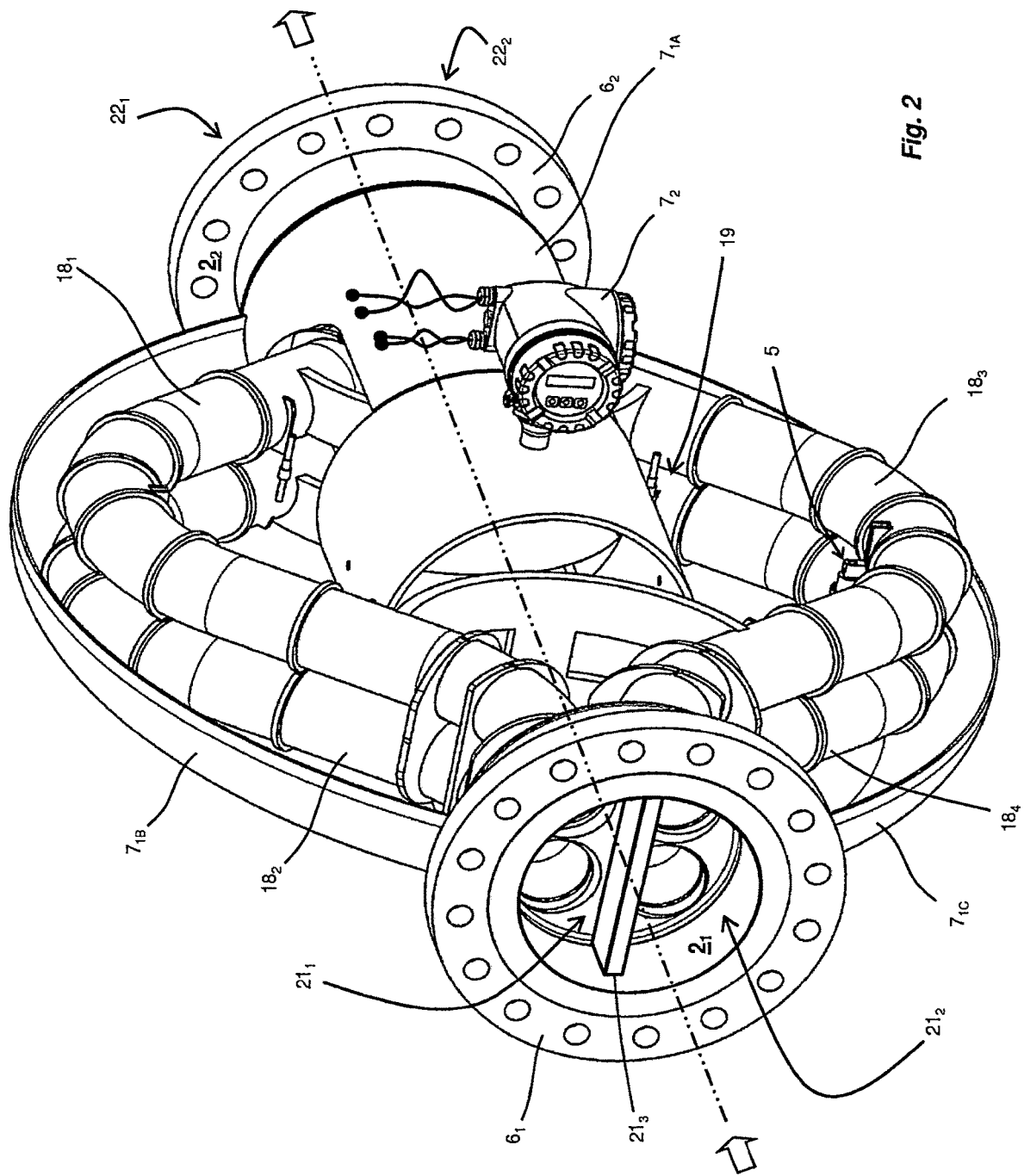
FIG. 2 is in a first perspective side view, a measuring transducer of vibration-type suitable for a measuring system of FIG. 1.
Figure 3B:
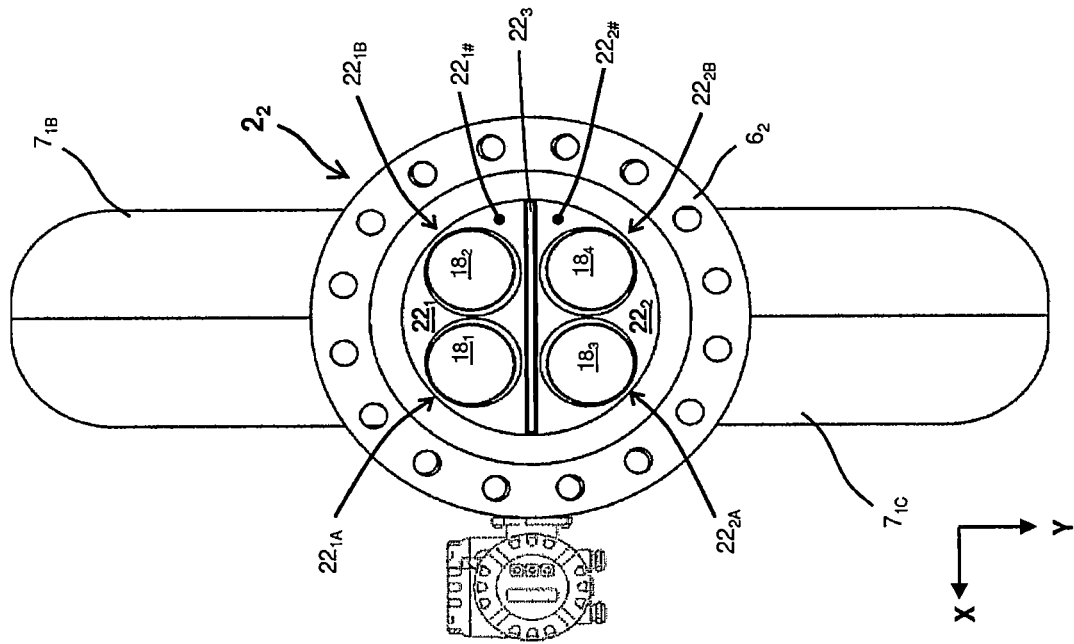
FIG. 3a, 3b shows a measuring system of FIG. 1 in a first, respectively second, planar end views.
Figure 3A:
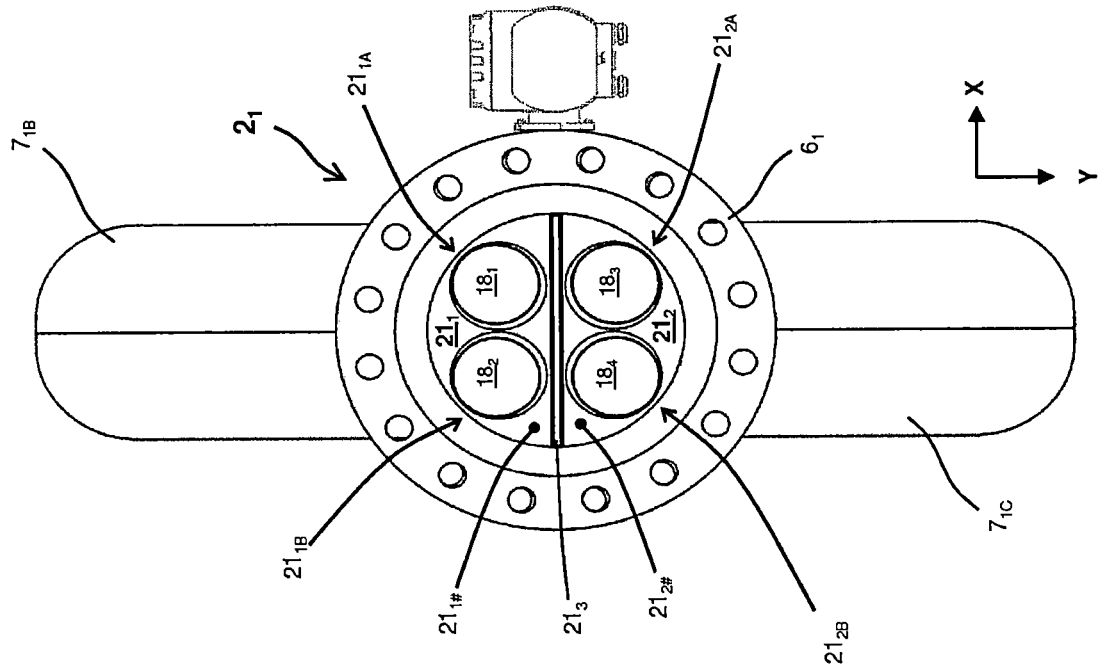
Figure 4:
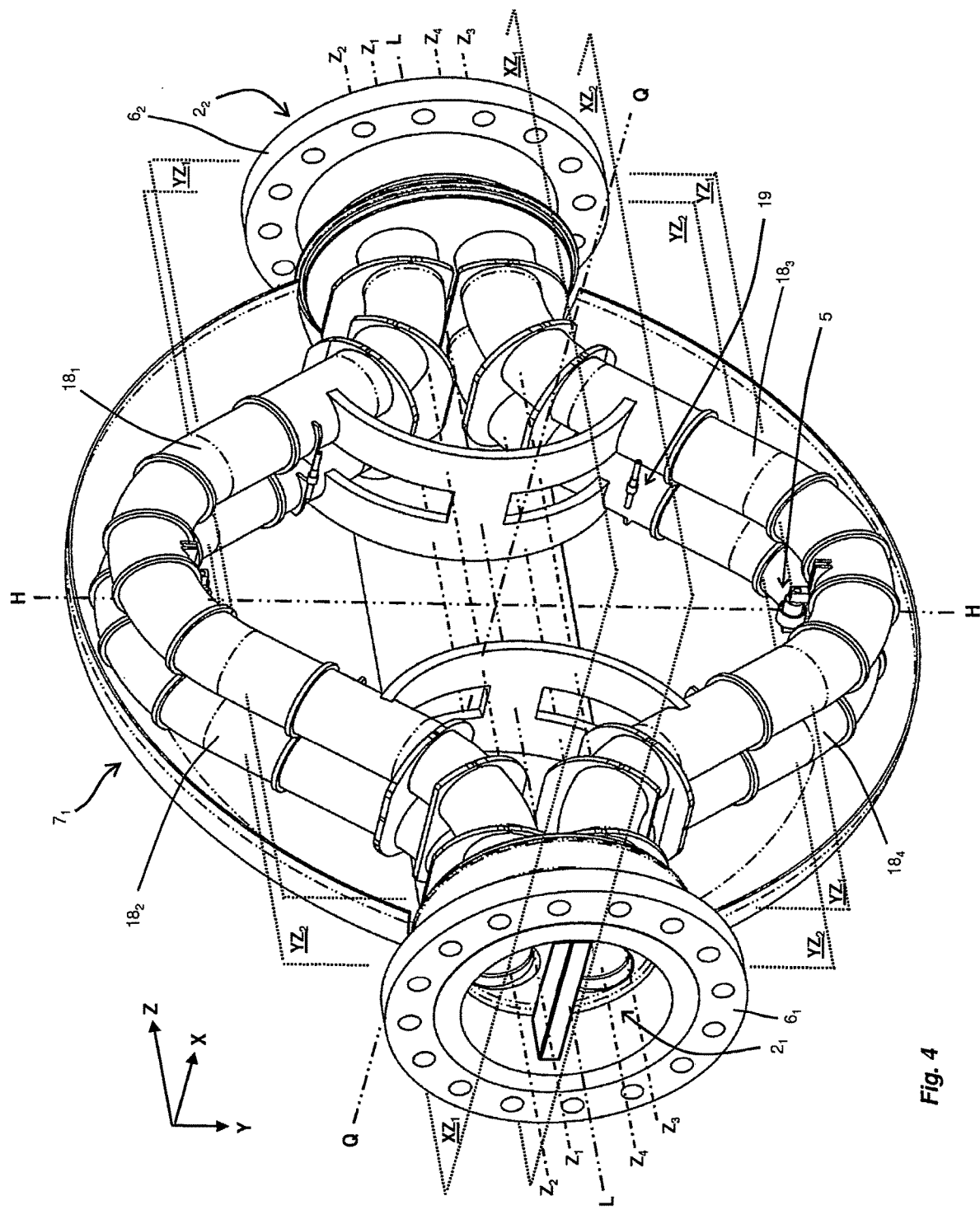
FIG. 4 is a partially sectioned, the measuring transducer of FIG. 2 in a second, perspective, side view.
Figure 5:
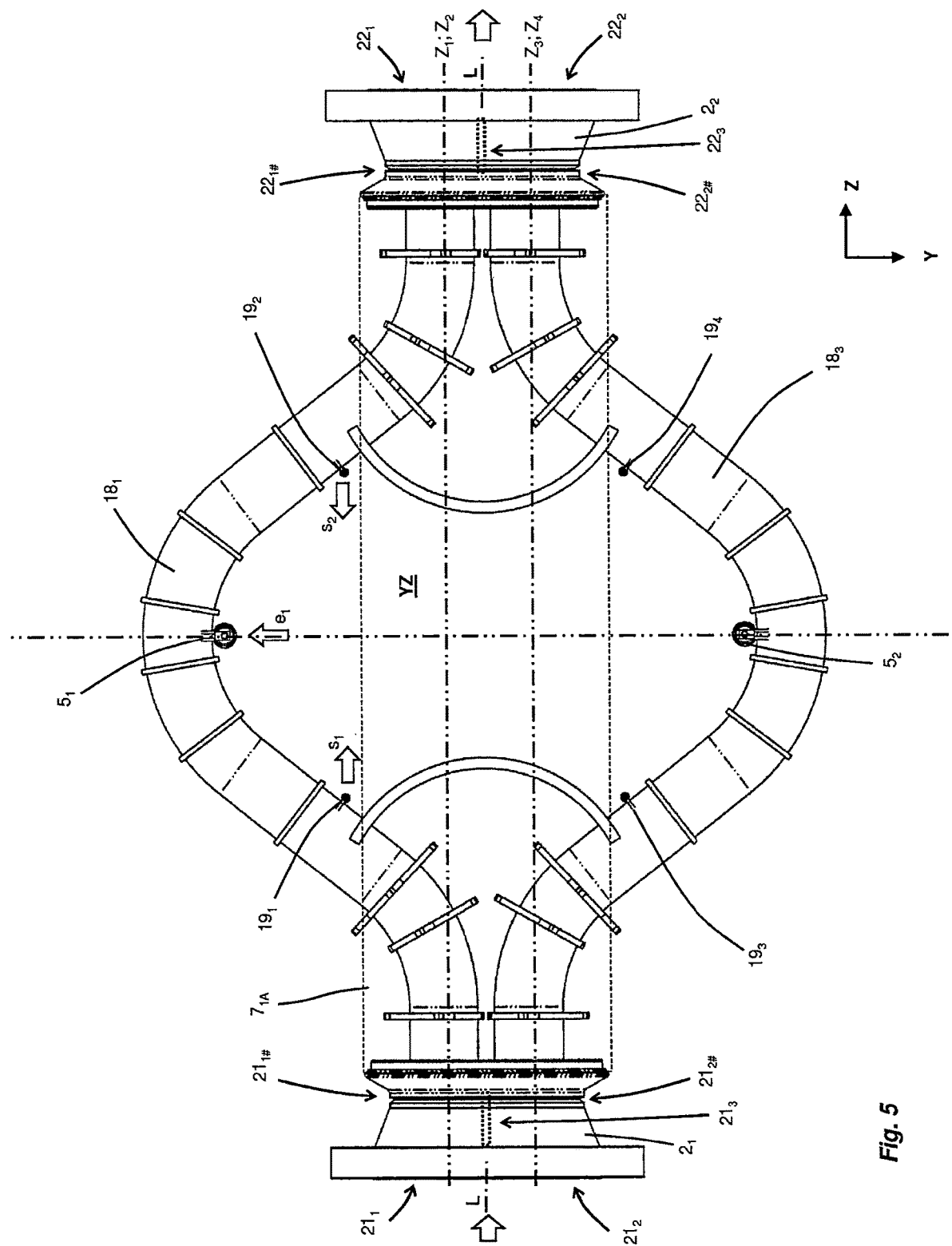
FIG. 5 is a partially sectioned, the measuring transducer of FIG. 2 in a first, planar, side view.

For guiding the fluid, the measuring transducer 11 comprises—such as shown, among others, in FIGS. 2, 4, and 5, and also directly evident from a combination of FIGS. 1, 2, 3a, 3b, 4 and 5—a first flow divider $2_1$, a second flow divider $2_2$ as well as a tube arrangement having at least four measuring tubes $18_1$, $18_2$, $18_3$, $18_4$. The four measuring tubes $18_1$, $18_2$, $18_3$, $18_4$ are connected to the flow dividers $2_1$, $2_2$—for example, equally-constructed flow dividers—to provide flow paths for parallel flow and, indeed, in a manner enabling vibrations, for example, namely bending oscillations, of the measuring tubes relative to one another.

The four measuring tubes—in the case of the variant of the measuring transducer shown in FIGS. 2-6 only pairwise parallel measuring tubes—communicate during operation, in each case, with the pipeline connected to the measuring transducer and are, during operation, for the purpose of generating reaction forces in the through flowing fluid at least at times, for example, also simultaneously, caused to vibrate in at least one actively excited oscillatory mode—the so-called wanted mode—suitable for ascertaining the physical, measured variable. Suited as material for the tube walls of the measuring tubes, which are, for example, in each case, monolithic, consequently, in each case, manufactured from one piece, is, for example, titanium, zirconium or tantalum, or alloys containing at least one of these metals or also a nickel based alloy. For most applications of industrial measurements technology, not least of all also applications in the petrochemical industry, the measuring tubes can, however, for example, also be made of a stainless steel, for example, also a duplex steel or a super duplex steel, which satisfy requirements as regards mechanical strength, chemical durability as well as thermal requirements. Moreover, the material for the four measuring tubes $18_1$, $18_2$, $18_3$, $18_4$ can, however, also be practically any other usually applied or at least suitable material, especially such having an as small as possible thermal expansion coefficient and an as high as possible yield point. In an additional embodiment of the invention, the measuring tubes are, furthermore, so embodied that a caliber of the measuring tube $18_1$ at least equals a caliber of the measuring tube $18_2$ and a caliber of the measuring tube $18_3$ at least equals a caliber of the measuring tube $18_4$, for example, also in such a manner that the caliber of the measuring tube $18_1$ also equals the caliber of the measuring tube $18_3$, respectively the caliber of the measuring tube $18_2$ also equals the caliber of the measuring tube $18_4$, so that, thus, the four measuring tubes $18_1$, $18_2$, $18_3$, $18_4$ are of equal caliber. In an additional embodiment of the invention, the measuring tubes $18_1$, $18_2$, $18_3$, $18_4$ are, furthermore, so formed and arranged that the tube arrangement, as a result, has two imaginary tube planes $YZ_1$, $YZ_2$—especially mutually parallel imaginary tube planes—, of which—as well as also schematically shown in FIG. 4—a first imaginary tube plane $YZ_1$ imaginarily cuts both the measuring tube $18_1$ as well as also the measuring tube $18_3$ lengthwise and a second imaginary tube plane $YZ_2$ imaginarily cuts both the measuring tube $18_2$ as well as also the measuring tube $18_4$ lengthwise, especially in such a manner that the first imaginary tube plane imaginarily halves both the first measuring tube as well as also the third measuring tube, namely splits each in the longitudinal direction imaginarily into two halves, and/or that the second imaginary tube plane imaginarily halves both the second measuring tube as well as also the fourth measuring tube, namely splits each in the longitudinal direction imaginarily into two halves.

For exciting mechanical oscillations of the measuring tubes $18_1$, $18_2$, $18_3$, $18_4$, not least of all also oscillations in the above-mentioned, wanted mode, the measuring transducer includes, furthermore, an electromechanical exciter mechanism 5. Moreover, the measuring transducer comprises also a sensor arrangement 19 for registering oscillatory movements of the measuring tubes $18_1$, $18_2$, $18_3$, $18_4$—for example, namely oscillatory movements of the measuring tubes $18_1$, $18_2$, $18_3$, $18_4$ oscillating in the wanted mode—and for generating both a first oscillation measurement signal s1 representing oscillations of at least one of the measuring tubes $18_1$, $18_2$, $18_3$, $18_4$, especially a first oscillation measurement signal having a signal frequency dependent on a density of a fluid guided in the tube arrangement, as well as also at least a second oscillation measurement signal s2 representing oscillations of at least one of the measuring tubes $18_1$, $18_2$, $18_3$, $18_4$, especially a second oscillation measurement signal having a signal frequency dependent on a density ρ of a fluid guided in the tube arrangement and/or a second oscillation measurement signal having a phase difference phase-shifted relative to the first oscillation measurement signal and dependent on a mass flow rate $\dot{m}$ of a fluid flowing through the tube arrangement.

In an additional embodiment of the invention, the measuring transducer includes a transducer housing $7_1$, for example, a steel transducer housing, of which, as well as also evident from FIGS. 1, 2, 3a, 3b, 4 and 5, a first housing end can be formed by means of the flow divider $2_1$ and a second housing end by means of the flow divider $2_2$. The transducer-housing $7_1$ includes, furthermore, a cavity, within which the tube arrangement formed by means of the measuring tubes $18_1$, $18_2$, $18_3$, $18_4$, the exciter mechanism as well as the sensor arrangement are placed, not least of all also protected from external environmental influences, for example, namely influences such as dust or water spray or even forces acting externally on the measuring transducer, etc. Moreover, the transducer-housing $7_1$ can, furthermore, in advantageous manner, also be so executed and so dimensioned that, in the case of possible damage to one or more of the measuring tubes contained therein, e.g. due to crack formation or bursting, outfluid flowing can be completely retained in the interior of the transducer-housing $7_1$ up to a required maximum positive pressure. The material of the transducer housing $7_1$ can be, for example, steel, such as, for instance, structural steel, respectively stainless steel. In an additional embodiment of the invention, it is, in such case, furthermore, provided that both the flow divider $2_1$ and also the flow divider $2_2$ are integral components of the transducer housing $7_1$, which, by way of example, is at least partially hollow cylindrical, in the case of the variant shown in FIGS. 1, 2, 3a, 3b, 4 and 5 namely partially essentially tubular, consequently also outwardly partially circularly cylindrical. For instance, the transducer housing $7_1$ has laterally bounding its cavity a side wall, which is affixed both to the flow divider $2_1$ as well as also to the flow divider $2_2$, for instance is connected by material bonding both with the flow divider $2_1$ as well as also the flow divider $2_2$. In the example of an embodiment shown in FIGS. 1, 2, 3a, 3b, 4 and 5, the transducer housing $7_1$ includes additionally a middle segment $7_{1A}$—here forming a part of the above-mentioned side wall. Middle segment $7_{1A}$ is formed by means of a straight tube—here also circularly cylindrical and, to begin with, formed of three parts. As, furthermore, directly evident from the combination of FIGS. 1, 2, 3a, 3b and 5, the middle segment $7_{1A}$, here serving also as a support frame for the tube arrangement, consequently embodied as a support tube, can, for example, also be formed by means of a tube having about a caliber of the pipeline to be connected, consequently corresponding, for example, to a nominal diameter of the measuring transducer, namely a tube correspondingly matched as regards caliber, wall thickness and material of the pipeline to be connected and, insofar, also as regards the allowed operating pressure. For the purpose of implementing an as compact as possible measuring transducer, not least of all also for the case, in which such should have a comparatively large nominal diameter of 250 mm or more, and/or the measuring tubes should be laterally extending, the transducer housing $7_1$ can, in advantageous manner, furthermore, be formed by means of a tube having corresponding lateral cavities—here, for the purpose of simplified handling, for example, a tube, to begin with, composed of three parts, thus three individual segments joined together—, and two housing caps $7_{1B}$, $7_{1C}$ lying opposite one another and laterally affixed, for instance, welded-on, to the tube ultimately forming the middle segment of the transducer housing. Housing caps $7_{1B}$, $7_{1C}$ envelop segments of the measuring tubes $18_1$, $18_2$, $18_3$, $18_4$ extending laterally out from the middle segment in a manner enabling vibrations, especially also bending oscillations, of the measuring tubes relative to one another, as well as also relative to the transducer housing $7_1$. Housing caps $7_{1B}$, $7_{1C}$ are equally as well selected to be only as little as possible greater than the segments. Of the two housing caps $7_{1B}$, $7_{1C}$, for example, equally-constructed housing caps $7_{1B}$, $7_{1C}$—as well as also evident from the combination of FIGS. 1, 2, 3a, 3b and 4—, for example, a first housing cap $7_{1B}$ can be capped over a segment of the measuring tube $18_1$ extending outwards on a first side of the middle segment $7_{1A}$—here serving also as support frame for the tube arrangement, and consequently formed as a support tube—and over a segment of the measuring tube $18_2$ extending outwards on the first side of the middle segment $7_{1A}$ and a second housing cap $7_{1C}$, for instance, a second housing cap constructed equally to the housing cap $7_{1B}$, can be capped over a segment of the measuring tube $18_3$ extending outwards on a second side of the middle segment $7_{1A}$ lying opposite the first side and over a segment of the measuring tube $18_4$ extending outwards on the second side of the middle segment.

In an additional embodiment of the invention, the flow divider $20_1$ is provided with a flange $6_1$ for connecting the measuring transducer to a first pipe segment of the above-mentioned pipeline serving, for example, for supplying fluid to the measuring transducer, and the flow divider $20_2$ is provided with a flange $6_2$ for connecting the measuring transducer to a second pipe segment of the pipeline serving, for example, for removing fluid from the measuring transducer. For connecting the measuring transducer with a respective corresponding pipe segment of the pipeline, each of the flanges includes, furthermore, in each case, a corresponding sealing surface, wherein a separation between the sealing surfaces defines an installed length of the measuring transducer. The flanges can as regards their inner diameter, their respective sealing surfaces as well as the flange bores serving for accommodating corresponding connection bolts be embodied corresponding to the nominal diameter provided for the measuring transducer as well as corresponding to the industrial standards relevant, in given cases, therefor, which correspond to a caliber, or to a nominal operating pressure, of the pipeline, in whose course the measuring transducer is to be used. Particularly for the mentioned case, in which the transducer housing is formed by means of a tubular segment useful as support tube, for example, namely the above-mentioned middle segment $7_{1A}$, and the segment, as well as also the flow dividers connected with the respective flanges in the in—, respectively outlet regions, have, in each case, the same inner diameter, the transducer housing can additionally also be formed in such a manner that the flanges are formed or welded on the ends of the tube forming the middle segment, and that the flow dividers are formed by means of plates having the flow openings, especially plates spaced somewhat from the flanges and the welded orbitally to the inner wall and/or by means of laser.

In the case of the measuring transducer of the invention, and the measuring system formed therewith—not least of all also for the purpose of conditioning the fluid flowing during operation into the measuring transducer and back out of the measuring transducer, thus for conditioning its flow profile, and/or for the purpose of reducing a pressure loss caused by the measuring transducer—there are provided in the flow divider $2_1$ two chambers $21_1$, $21_2$, which are separated from one another, for example, by a single partition $21_3$. Each of the chambers is tubular and adapted for guiding in- and out flowing fluid. Also provided in the flow divider $2_2$, which is, for example, equally-constructed to the flow divider $2_1$, are two, likewise tubular chambers $22_1$, $22_2$ separated from one another, for example, by a single partition $22_3$. Of the two chambers $21_1$, $21_2$ of the flow divider $2_1$, as well as also directly evident from a combination of FIGS. 1, 2, 3a, 3b and 5, a first chamber $21_1$ has a chamber floor $21_{1\#}$, in which two mutually spaced flow openings $21_{1A}$, $21_{1B}$ are formed, which communicate with a lumen of the chamber $21_1$ and are, for example, also equally constructed, and a second chamber $21_2$ has a chamber floor $21_{2\#}$, in which likewise two mutually spaced flow openings $21_{2A}$, $21_{2B}$ are formed, which communicate with a lumen of the chamber $21_2$ and are, for example, equally constructed, while, of the two chambers $22_1$, $22_2$ of the flow divider $2_2$, a first chamber $22_1$ has a chamber floor $22_{1\#}$, in which two mutually spaced flow openings $22_{1A}$, $22_{1B}$ are formed, which communicate with a lumen of the chamber $22_1$ and are, for example, equally constructed, and a second chamber $22_2$ has a chamber floor $22_{2\#}$, in which two mutually spaced flow openings $22_{2A}$, $22_{2B}$ are formed, which communicate with a lumen of the chamber $22_2$ and are, for example, equally constructed. As, furthermore, evident, from a combination of FIGS. 2, 3a, 3b and 5, in the case of the measuring transducer of the invention, of the four measuring tubes $18_1$, $18_2$, $18_3$, $18_4$ of the tube arrangement, a first measuring tube $18_1$ communicates with an inlet-side, first measuring tube end with a first flow opening $20_{1A}$ of the chamber $21_1$ and with an outlet-side, second measuring tube end with a first flow opening $20_{2A}$ of the chamber $22_1$, a second measuring tube $18_2$—, for example, one at least sectionally parallel to the measuring tube $18_1$—communicates with an inlet-side, first measuring tube end with a second flow opening $20_{1B}$ of an the chamber $21_1$ and with an outlet-side, second measuring tube end with a second flow opening $20_{2B}$ of the chamber $22_1$, a third measuring tube $18_3$ communicates with an inlet-side, first measuring tube end with a first flow opening $20_{1C}$ of the chamber $21_2$ and with an outlet-side, second measuring tube end with a first flow opening $20_{2C}$ of the chamber $22_2$ and a fourth measuring tube $18_4$—, for example, one at least sectionally parallel to the measuring tube $18_3$—communicates with an inlet-side, first measuring tube end with a second flow opening $20_{1D}$ of the chamber $21_2$ and with an outlet-side, second measuring tube end with a second flow opening $20_{2D}$ of the chamber $22_2$. Each of the above-mentioned chambers can be embodied e.g. at least sectionally hollow cylindrically, namely in the form of a hollow chamber bounded by a respective jacket-, or cylindrical surface, formed by mutually parallel lines, for example, also in such a manner that, in given cases, the lumen of the respective chamber $21_1$, $21_2$, $22_1$, respectively $22_2$ is composed, in each case, of a plurality of imaginary cross sectional areas lying one behind the other, equally as well mutually parallel and/or similar, imaginary cross sectional areas, with—such as indicated in FIGS. 3a, 3b, or evident from a combination of FIGS. 2 and 3a, respectively 2 and 3b—for example, in each case, circular segment shaped, or D-shaped silhouette or contour.

The flow openings formed in the chamber floor $21_{1\#}$ in $21_{1A}$, $21_{1B}$ and the flow openings formed in the chamber floor $21_{2\#}$ in $21_{2A}$, $21_{2B}$ are according to an additional embodiment of the invention, furthermore, so arranged that—as well as also indicated in FIG. 3a—a minimum separation between the two flow openings $21_{1A}$, $21_{1B}$ equals a minimum separation between the flow openings $21_{2A}$, $21_{2B}$, or a minimum separation between the flow opening $21_{1A}$ formed in the chamber floor $21_{1\#}$ and the flow opening $21_{2A}$ formed in the chamber floor $21_{2\#}$ equals a minimum separation between the flow opening $21_{1B}$ formed in the chamber floor $21_{1\#}$ and the flow opening $21_{2B}$ formed in the chamber floor $21_{2\#}$. Alternatively or supplementally, the flow openings formed in the chamber floor $22_{1\#}$ in $22_{1A}$, $22_{1B}$ and the flow openings formed in the chamber floor $22_{2\#}$ in $22_{2A}$, $22_{2B}$ can—such as, among others, also indicated in FIG. 3b—correspondingly be so arranged that a minimum separation between the flow openings formed in the chamber floor $22_{1\#}$ in $22_{1A}$, $22_{1B}$ equals a minimum separation between the flow openings formed in the chamber floor $22_{2\#}$ in $22_{2A}$, $22_{2B}$ and/or that a minimum separation between the flow opening $22_{1A}$ formed in the chamber floor $22_{1\#}$ and the flow opening $22_{2A}$ formed in the chamber floor $22_{2\#}$ equals a minimum separation between the flow opening $22_{1B}$ formed in the chamber floor $22_{1\#}$ and the flow opening $22_{2B}$ formed in the chamber floor $22_{2\#}$. In an additional embodiment of the invention, it is, furthermore, provided, to so construct the flow dividers $2_1$, $2_2$ that the chamber $21_1$ of the flow divider $2_1$ is of equal construction with at least one of the chambers $22_1$, $22_2$ of the flow divider $2_2$, for example, also in such a manner that the chamber $21_1$ is of equal construction with only one chamber of the flow divider $2_2$. Alternatively thereto or in supplementation thereof, it is, furthermore, provided to construct the chamber $21_2$ of the flow divider $2_1$ such that it is of equal construction with at least one chamber of the flow divider $2_2$, for example, also in such a manner that the chamber $21_2$ is of equal construction with only one chamber of the flow divider $2_2$.

Figure 7:
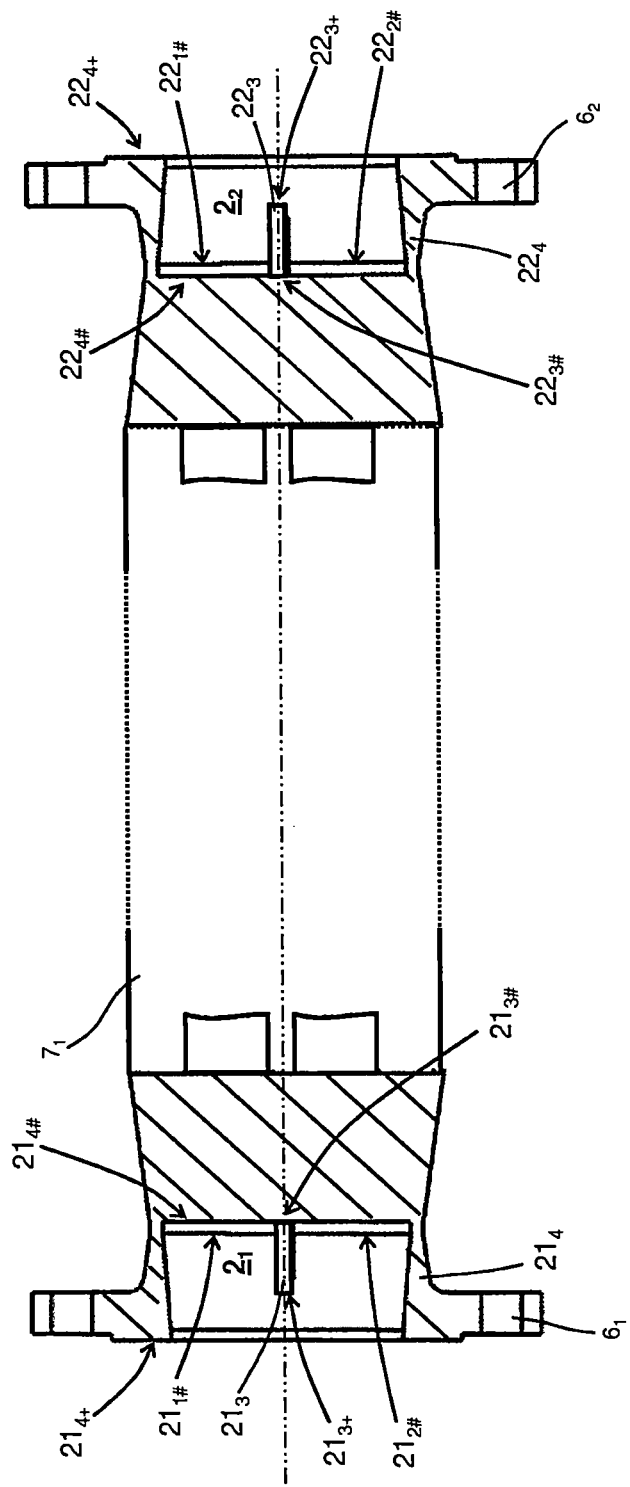
FIG. 7 shows in a first planar, sectioned side view, variants of flow dividers suitable for a measuring transducer of FIG. 2.
Figure 8:
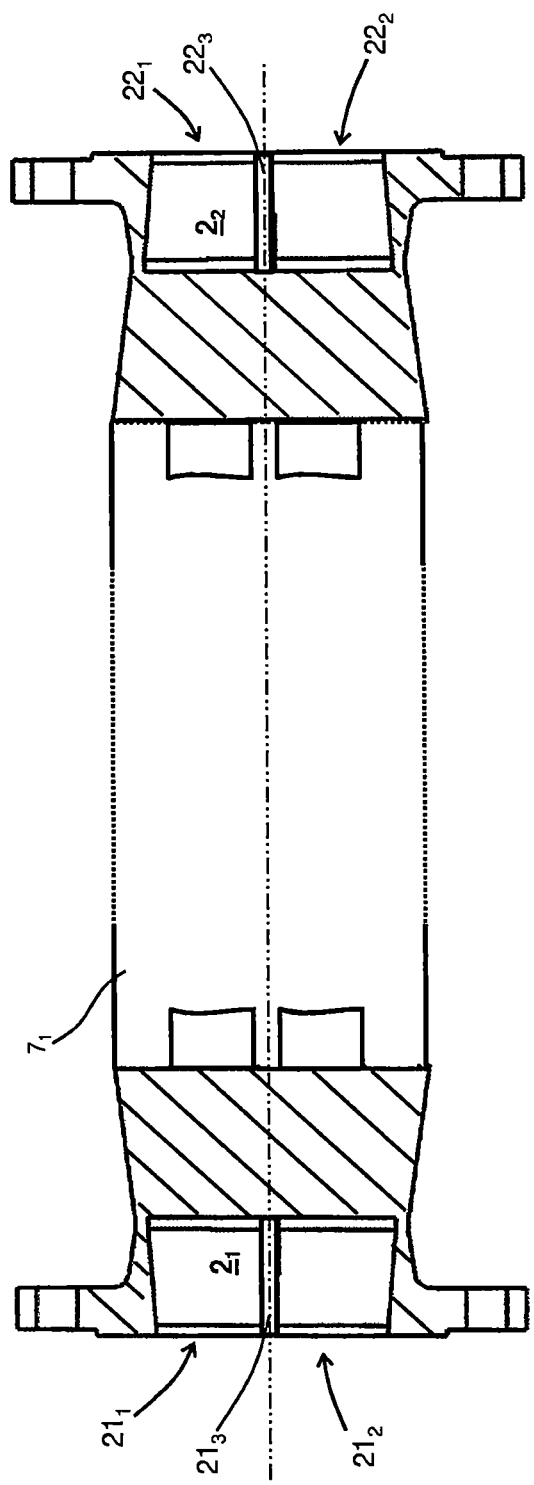
FIG. 8 shows in a planar, sectioned side view, other variants of flow dividers suitable for a measuring transducer of FIG. 2.

For forming the two chambers $21_1$, $21_2$, the flow divider $2_1$ includes, according to an additional embodiment of the invention, such as schematically shown especially also in FIG. 7, and also directly evident from a combination of FIGS. 2, 3a, 3b, 4, 5 and 7, a connection nozzle $21_4$—, for example, an essentially tubular, or hollow cylindrical, connection nozzle—extending from a proximal—here essentially annular—, truncated end $21_{4\#}$, namely a truncated end bordering both on an outer—here essentially circular arc like—edge zone of the chamber floor $21_{1\#}$ of the associated chamber $21_1$, as well as also an outer—here likewise essentially circular arc like—edge zone of the chamber floor $21_{2\#}$ of the associated chamber $21_2$, to a distal—here essentially annular—, truncated end $21_{4+}$, namely a truncated end remote both from the chamber floor $21_{1\#}$ as well as also from the chamber floor $21_{2\#}$, as well as, arranged within a lumen of the connection nozzle $21_4$, a partition $21_3$—for example, a plate-shaped partition—having a first lateral edge contacting the connection nozzle and a second lateral edge contacting the connection nozzle and extending from a proximal partition end $21_{3\#}$, namely one bordering both an inner edge zone of the chamber floor $21_{1\#}$ of the associated chamber $21_1$ as well as also an inner edge zone of the chamber floor $21_{2\#}$ of the associated chamber $21_{2\#}$, to a distal partition end $21_{3+}$, namely one remote both from the chamber floor $21_{1\#}$ as well as also from the chamber floor $21_{2\#}$. Partition $21_3$ and connection nozzle $21_4$ are, furthermore, so arranged and embodied that the chamber $21_1$ is bounded laterally by the partition $21_3$ as well as a first segment of the connection nozzle $21_4$ extending between the above-mentioned first lateral edge of the partition $21_3$ and the above-mentioned second lateral edge of the partition $21_3$ and that the chamber $21_2$ is bounded laterally by the partition $21_3$ as well as a second segment of the connection nozzle $21_4$ extending between the above-mentioned first lateral edge of the partition $21_3$ and the second lateral edge of the partition $21_3$. Furthermore, the flow divider $2_2$ includes, according to an additional embodiment of the invention, a connection nozzle $22_4$—for example, a tubular and/or hollow cylindrical, connection nozzle—extending from a proximal—for example, annular—, truncated end $22_{4\#}$, namely a truncated end bordering both an outer—for example, circular arc like—edge zone of the chamber floor $22_{1\#}$ of the associated chamber $22_1$ as well as also an outer—for example, circular arc like—edge zone of the chamber floor $22_{2\#}$ of the associated chamber $22_2$, to a distal—for example, annular—, truncated end $22_{4+}$, namely a truncated end remote both from the chamber floor $22_{1\#}$ as well as also from the chamber floor $22_{2\#}$, as well as, arranged within a lumen of the connection nozzle $22_4$, a partition $22_3$—, for example, a plate-shaped partition—having a first lateral edge contacting the connection nozzle $22_4$ and a second lateral edge contacting the connection nozzle $22_4$ and extending from a proximal partition end $22_{3\#}$, namely one bordering both an inner edge zone of the chamber floor $22_{1\#}$ as well as also an inner edge zone of the chamber floor $22_{2\#}$, to a distal partition end $22_{3+}$, namely one remote both from the chamber floor $22_{1\#}$ as well as also from the chamber floor $22_{2\#}$. Partition $22_3$ and connection nozzle $22_4$ are, furthermore, so arranged and embodied that the chamber $22_1$ is bounded laterally by the partition $22_3$ as well as a first segment of the connection nozzle $22_4$ extending between the first lateral edge of the partition $22_3$ and the second lateral edge of the partition $22_3$ and that the chamber $22_2$ is bounded laterally by the partition $22_3$ as well as a second segment of the connection nozzle $22_4$ extending between the first lateral edge of the partition $22_3$ and the second lateral edge of the partition $22_3$. The partition $21_3$ and the partition $22_3$ can be so dimensioned as regards a respective wall length, measured as, in each case, a shortest separation between the respective proximal partition end and the respective distal partition end, for example, in each case, that—such as, among other things, also directly evident from FIG. 7—the particular wall length is, in each case, less than a respective nozzle length of the respectively associated connection nozzle $21_4$, or $22_4$, as the case may be, measured as a shortest separation between the respective proximal nozzle end $21_{4\#}$, or $22_{4\#}$ and the respective distal nozzle end $21_{4+}$, or $22_{4+}$, e.g. in such a manner that the wall length of each of the partitions amounts, in each case, to greater than 0.3-times the nozzle length of the respectively associated connection nozzle, equally as well less than 0.9-times the nozzle length. The partitions $21_3$ and $22_3$ and the connection nozzles $21_4$ and $22_4$ can, however, for example, also be so dimensioned that—as well as also indicated in FIG. 8—the wall length of the partition $21_3$ equals the nozzle length of the associated connection nozzle $21_4$ and/or that the wall length of the partition $22_3$ equals the nozzle length of the associated connection nozzle $22_4$.

Each of the above-mentioned partitions $21_3$, $22_3$ can, furthermore, be so embodied that the respective chamber facing surfaces are essentially planparallel. Moreover, the partitions $21_3$, $22_3$ can additionally be so embodied and arranged that, as a result, each of the chambers $21_1$, $21_2$, respectively $22_1$, $22_2$, formed therewith is equally as large as a respective adjoining chamber, namely a chamber bordering the same partition, and/or that the two chambers of a flow divider are equal in shape. It can, however, also be quite advantageous to construct and/or to place the partitions at least sectionally warped such that, as a result, differently large and/or differently formed chambers $21_1$, $21_2$, $22_1$, $22_2$ are formed, for example, namely in order to achieve an improved dividing of the fluid flowing to the four measuring tubes, or a better matched dividing of flow resistances of the measuring transducer 11 for the tube arrangement and/or a planned installed situation. For example, the partition of the first flow divider can be at least sectionally warped, for instance, in such a manner that a surface facing the respective first chamber of the first flow divider is convex and a surface facing the second chamber of the first flow divider is concave, and/or the partition of the second flow divider can be at least sectionally warped, in such a manner that a surface facing the first chamber of the second flow divider is convex and a surface facing the second chamber of the second flow divider is concave.

Figure 6:
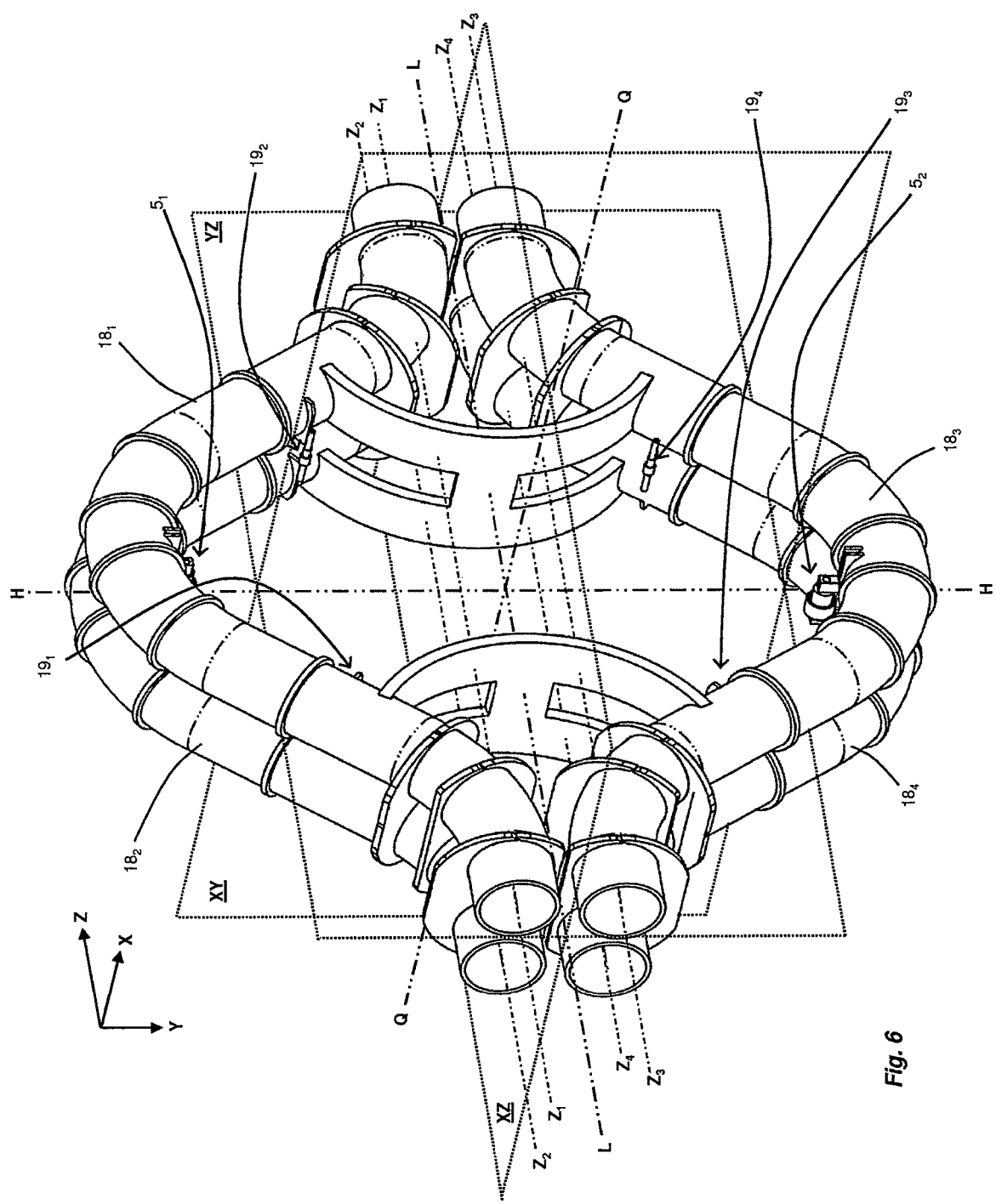
FIG. 6 is in perspective side view, a tube arrangement suitable for a measuring transducer of FIG. 2.

In an additional embodiment of the invention, the measuring tubes are, furthermore, so formed and arranged that the tube arrangement formed therewith has at least two mutually perpendicular, imaginary symmetry planes XY, YZ, relative to which the tube arrangement is, in each case, mirror symmetric. A first symmetry plane YZ of the tube arrangement is formed by an imaginary longitudinal section plane YZ of the tube arrangement extending both between the measuring tube $18_1$ and measuring tube $18_2$ as well as also between the measuring tube $18_3$ and measuring tube $18_4$, while a second symmetry plane XY of the tube arrangement corresponds to an imaginary cross sectional plane of the measuring transducer perpendicular to the first symmetry plane YZ and cutting each of the four measuring tubes along its respective central cross section. In the case of the variant of the measuring transducer shown in FIGS. 2-6, and of the measuring system formed therewith, the central cross section represents, additionally, in each case, a peak of the respective measuring tube. As shown in FIGS. 2, 5 and 6, or directly detectable from a combination of these figures, the measuring tubes $18_1$, $18_2$, $18_3$, $18_4$ can, furthermore, for example, be equally constructed and additionally also be so arranged that the tube arrangement formed therewith has yet a third symmetry plane XZ, relative to which the tube arrangement is, in each case, likewise mirror symmetric. Symmetry plane XZ corresponds, in such case, to a second imaginary longitudinal section plane XZ lying both between the measuring tube $18_1$ and the measuring tube $18_3$ as well as also between the measuring tube $18_2$ and the measuring tube $18_4$, and perpendicular both to the above-mentioned cross sectional plane as well as also to the above-mentioned first longitudinal section plane. By such an arrangement of the measuring tubes, bending oscillations can be induced in them, and transverse forces acting essentially perpendicular to the line of intersection of the two aforementioned imaginary longitudinal section planes, even in the case of application of four bent measuring tubes, can be largely canceled.

Additionally, the two flow dividers $20_1$, $20_2$ can, furthermore, be so embodied and so arranged in the measuring transducer that, as well as also schematically shown in FIGS. 4, 5 and 6, an imaginary first connecting axis $Z_1$ of the measuring transducer imaginarily connecting the flow opening $21_{1A}$ of the flow divider $2_1$ with the flow opening $22_{1A}$ of the flow divider $2_2$ extends parallel to an imaginary second connecting axis $Z_2$ of the measuring transducer imaginarily connecting the flow opening $21_{1B}$ of the flow divider $2_1$ with the flow opening $22_{1B}$ of the flow divider $2_2$, and that an imaginary third connecting axis $Z_3$ of the measuring transducer imaginarily connecting the flow opening $21_{2A}$ of the flow divider $2_1$ with the flow opening $22_{2A}$ of the flow divider $2_2$ extends parallel to an imaginary fourth connecting axis $Z_4$ of the measuring transducer imaginarily connecting the flow opening $21_{2B}$ of the flow divider $2_1$ with the flow opening $22_{2B}$ of the flow divider $2_2$. As shown, furthermore, in FIGS. 4, 5 and 6, and also evident from a combination of these figures, the flow dividers $2_1$, $2_2$ can, furthermore, be so embodied and so arranged in the measuring transducer that the above-mentioned connecting axes $Z_1$, $Z_2$, $Z_3$, $Z_4$ are also parallel to a principal flow axis L of the measuring transducer essentially aligning with the pipeline and/or coincident with the aforementioned line of intersection of the two imaginary longitudinal section planes of the tube arrangement. Furthermore, the two flow dividers $2_1$, $2_2$ can additionally also be so embodied and so arranged in the measuring transducer that a first imaginary longitudinal section plane $YZ_1$ of the measuring transducer, within which the first imaginary connecting axis $Z_1$ and the third imaginary connecting axis $Z_3$ extend, is parallel to a second imaginary longitudinal section plane $YZ_2$ of the measuring transducer, within which the imaginary second connecting axis $Z_2$ and the imaginary fourth connecting axis $Z_4$ extend. Moreover, the measuring tubes can, furthermore, be so embodied and so arranged in the measuring transducer that the above-mentioned imaginary first longitudinal section plane (YZ) of the tube arrangement, such as, among others, also detectable from the combination of FIGS. 4, 5 and 6, lies between the aforementioned first imaginary longitudinal section plane $YZ_1$ of the measuring transducer and the aforementioned second imaginary longitudinal section plane $YZ_2$ of the measuring transducer, for example, also such that the first longitudinal section plane of the tube arrangement is parallel to the first and second longitudinal section planes $YZ_1$, $YZ_2$ of the measuring transducer. Additionally, the measuring tubes can be so embodied and arranged that the second imaginary longitudinal section plane (XZ) of the tube arrangement extends between a third imaginary longitudinal section plane $XZ_1$ of the measuring transducer, within which the first imaginary connecting axis $Z_1$ and the second imaginary connecting axis $Z_2$ extend, and a fourth imaginary longitudinal section plane $XZ_2$ of the measuring transducer, within which the third imaginary connecting axis $Z_3$ and the fourth imaginary connecting axis $Z_4$ extend, for instance, in such a manner that the second imaginary longitudinal section plane (XZ) of the tube arrangement is parallel to the third imaginary longitudinal section plane $X_{Z1}$ of the measuring transducer and parallel to the fourth imaginary longitudinal section plane $X_{Z2}$ of the measuring transducer. Furthermore, the tube arrangement can be so embodied and so placed in the transducer housing that, as a result, not only the shared line of intersection of the first and second imaginary longitudinal section planes of the tube arrangement is parallel and coincident with the longitudinal axis L, but, instead, also a shared line of intersection of the first longitudinal section plane (YZ) and the cross sectional plane (XY) is parallel to an imaginary transverse axis Q of the measuring transducer perpendicular to the longitudinal axis L, and a shared line of intersection of the second longitudinal section plane (XZ) and the cross sectional plane (XY) is parallel to an imaginary vertical axis H of the measuring transducer perpendicular both to the imaginary longitudinal axis L as well as also to the imaginary transverse axis Q. The flow openings $21_{1A}$, $21_{1B}$, $21_{2A}$, $21_{2B}$ can, furthermore, be so arranged that their imaginary areal centers of gravity, which belong to the—here circularly shaped—cross sectional areas of the flow openings, form the vertices of an imaginary rectangle or an imaginary square, for example, also in such a manner that these cross sectional areas lie, in turn, in a shared imaginary cross sectional plane of the flow divider 21 extending perpendicular to a longitudinal axis L of the measuring transducer—for example, a longitudinal axis extending within the first longitudinal section plane (YZ) of the tube arrangement, and parallel to or also coincident with the principal flow axis of the measuring transducer parallel—, and also perpendicular to the above-mentioned longitudinal section planes of the measuring transducer. Equally, also the flow openings $22_{1A}$, $22_{1B}$, $22_{2A}$, $22_{2B}$ can be so arranged that imaginary areal centers of gravity associated with—here likewise circularly shaped—cross sectional areas of the flow openings likewise form vertices of an imaginary rectangle or square, for example, also in such a manner that the cross sectional areas lie, in turn, in a shared imaginary, cross sectional plane of the flow divider $2_2$ extending perpendicularly to the main flow—or also longitudinal axis L of the measuring transducer, respectively perpendicular to the longitudinal section planes of the measuring transducer.

The measuring tubes $18_1$, $18_2$, $18_3$, $18_4$ are, according to an additional embodiment, at least pairwise of equal construction and/or arranged at least pairwise, or at least sectionally, parallel to one another, for example, also in such a manner that measuring tubes $18_1$, $18_2$, $18_3$, $18_4$ are arranged—, as well as also shown, by way of example, in FIGS. 2, 4 and 5—extending only pairwise mutually parallel or—as well as also directly evident from FIGS. 12a and 12b are at best or only pairwise, of equal construction. Additionally, the measuring tubes $18_1$, $18_2$, $18_3$, $18_4$ of the measuring system of the invention can—, as well as also shown in FIGS. 2, 4, 5, 6, 11, 12a, 12b, or as well as also directly evident from a combination of FIGS. 2, 4, 5, and 6, or FIGS. 11, 12a, 12b—be embodied as bent measuring tubes, for example, namely measuring tubes at least sectionally circular arc shaped and/or at least sectionally V-, or U-shaped, in such a manner that each of the measuring tubes $18_1$, $18_2$, $18_3$, $18_4$, in each case, has at least one bent tube segment—especially, in each case, a circular arc shaped tube segment and/or a tube segment forming, in each case, a center of the respective measuring tube. Supplementally, the four measuring tubes can, furthermore, be so embodied that each is—, as well as also shown by way of example in FIGS. 2, 4, 5, 6, 11, 12a,—sectionally straight. According to an additional embodiment of the invention, it is, furthermore, especially provided that each of the measuring tubes, especially, in each case, V-shaped, measuring tubes, has, in each case, three bent tube segments—especially, in each case, circular arc shaped, bent tube segments—, especially in such a manner that two mutually adjoining bent tube segments of the respective measuring tube are, in each case, connected with one another via a straight tube segment of the measuring tube located therebetween. In an additional embodiment of the invention, the measuring tubes are not only embodied bent in the above-mentioned manner, for example, namely U- or V-shaped, but, instead, additionally are also so formed and arranged—, as well as also evident from FIGS. 11, 12a and 12b, or their combination—that the at least one bent tube segment of each of the, here, in each case, V-shaped, measuring tubes, is, in each case, parallel to a, or the, at least one bent tube segment of each of the other measuring tubes, or that not only each of the measuring tube is V-shaped, but, instead, the measuring tubes are also so arranged that the tube arrangement has, as a whole, a V-shaped silhouette. Alternatively to a tube arrangement formed by means of four bent measuring tubes, the measuring transducer can, however,—as well as also shown, by way of example, in FIG. 15—, also have a tube arrangement, which is formed by means of four straight measuring tubes.

For activating the above-mentioned exciter mechanism of the measuring transducer and for processing at least one of the oscillation measurement signals generated by the sensor arrangement of the measuring transducer, for example, namely for ascertaining the above-mentioned measured values representing the at least one measured variable, the measuring system, according to an additional embodiment of the invention, further comprises a transmitter electronics 12 (not shown here in detail) electrically connected with the measuring transducer 11. Transmitter electronics 12 can be accommodated, for example, in a separate electronics housing $7_2$, which is arranged removed from the measuring transducer or, such as shown in FIGS. 1, 9, and 13, affixed directly to the measuring transducer 11, for example, namely externally on the transducer housing $7_1$, in order to form a compact measuring device. Provided for holding the electronics housing $7_2$ on the transducer housing $7_1$ can be a necklike, housing-connection nozzle. A hermetically sealed and/or pressure resistant feedthrough, for example, one manufactured by means of glass- and/or plastic, provided within the housing-connection nozzle can contain electrical connecting lines extending between measuring transducer 11, especially namely its oscillation exciters and—sensors, and transmitter electronics 12. The transmitter electronics 12, for example, formed by means of one or more microprocessors and/or by means of one or more digital signal processors, can e.g., furthermore, be so designed that, during operation of the measuring system, it can exchange measuring—and/or other operating data via a data transmission system, for example, a wired fieldbus system and/or wirelessly per radio, with a measured value processing unit superordinated thereto, for example, a programmable logic controller (PLC), a personal computer and/or a work station. Furthermore, the transmitter electronics 12 can be adapted, during operation, to be fed by an external energy supply, for example, also via the aforementioned fieldbus system. For the case, in which the measuring system is supposed to couple to a fieldbus—or other communication system, the transmitter electronics 12, for example a transmitter electronics, which is reprogrammable on-site and/or via a communication system, can additionally have a corresponding communication interface for data communication, e.g. for sending measured data to the aforementioned programmable logic controller or to a superordinated process control system and/or for receiving settings data for the measuring system.

As already mentioned, in the case of the measuring transducer 11, the reaction forces required for measuring in the fluid to be measured are effected by, for example, simultaneously, causing the measuring tubes $18_1$, $18_2$, $18_3$, $18_4$ to oscillate in the actively excited, wanted mode. For exciting oscillations of the measuring tubes, not least of all also oscillations in the wanted mode, the measuring transducer further comprises an exciter mechanism 5 formed by means of at least one electro-mechanical oscillation exciter $5_1$, for example, an electro-dynamic, oscillation exciter, acting on the measuring tubes $18_1$, $18_2$, $18_3$, $18_4$, serving to cause each of the measuring tubes operationally at least at times to execute and to maintain oscillations suitable for the actual measuring, especially bending oscillations, in the wanted mode with, in each case, oscillation amplitude sufficiently large for producing and registering the above mentioned reaction forces in the fluid. The at least one oscillation exciter $5_1$, consequently the exciter mechanism formed therewith, serves, in such case, especially, to convert an electrical excitation power $P_{exc}$ fed from the transmitter electronics 12—for instance, by means of at least one electrical driver signal e1—into such exciter forces $F_{exc}$, e.g. pulsating or harmonic, exciter forces $F_{exc}$, which act as simultaneously as possible, uniformly, however, with opposite sense, on at least two of the measuring tubes, for instance, the first and second measuring tubes, in given cases, also from the two measuring tubes further to be coupled mechanically to the other two measuring tubes—directly via corresponding coupling elements mechanically connecting namely only the first measuring tube and the third measuring tube, respectively only the second measuring tube and the fourth measuring tube, with one another and/or indirectly via the flow divider—, and so to bring about simultaneous oscillations of all four measuring tubes in the wanted mode The exciter forces $F_{exc}$ generated by converting electrical excitation power $P_{exc}$ fed into the exciter mechanism 5 can, in manner known per se to those skilled in the art, be tuned as regards their amplitude, e.g. by means of an operating circuit provided in the transmitter electronics 12, and lastly delivering the driver signal, for instance, electrical current- and/or voltage-controllers implemented by means of the operating circuit, and as regards their frequency, e.g. by means of a phase locked loop (PLL) likewise provided in operating circuit. Transmitter electronics 12 can feed into the exciter mechanism the electrical excitation power required for generating the exciter forces by means of an electrical driver signal, which is supplied to the oscillation exciter, consequently the exciter mechanism, for example, via connecting lines and/or which is at least at times periodic, and which is variable with at least one signal frequency corresponding to a frequency equaling a resonant frequency of a natural mode of oscillation of the tube arrangement, respectively a frequency corresponding therewith. Moreover, it can, furthermore, be advantageous—for instance, for the purpose of fitting the fed-in excitation power to that instantaneously actually necessary for a sufficient oscillation amplitude—, to make the at least one driver signal e1 variable as regards a maximum voltage level (voltage amplitude) and/or a maximum electrical current level (electrical current amplitude).

Goal of the active exciting of the measuring tubes to execute oscillations is, among other things, not least of all also for the case, in which the measuring system formed by means of the measuring transducer should be helpful ultimately for measuring the mass flow, respectively the mass flow rate, to induce by means of the measuring tubes vibrating in the wanted mode sufficiently strong Coriolis forces in the flowing fluid, such that, as a result, additional deformations of each of the measuring tubes corresponding to an oscillatory mode of higher order of the tube arrangement—the so-called Coriolis mode—can be effected with oscillation amplitude sufficient for measuring. For example, the measuring tubes $18_1$, $18_2$, $18_3$, $18_4$ can be excited by means of the electro-mechanical exciter mechanism 5 applied thereto to execute bending oscillations, especially simultaneous bending oscillations, especially at an instantaneous mechanical resonant frequency of the tube arrangement formed by means of the four measuring tubes $18_1$, $18_2$, $18_3$, $18_4$, in the case of which they are—at least predominantly—laterally deflected and caused to oscillate pairwise essentially opposite-equally to one another. This, for example, also in such a manner that vibrations executed by each of the measuring tubes $18_1$, $18_2$, $18_3$, $18_4$ during operation are simultaneously embodied, at least at times and/or at least partially, in each case, as bending oscillations about an imaginary oscillatory axis connecting the first and the, in each case, associated second measuring tube end of the respective measuring tube, in each case, parallel to the mentioned connecting axes $Z_1$, $Z_2$, $Z_3$, $Z_4$, wherein the four oscillatory axes can equally be parallel to one another, as well as also to the imaginary longitudinal axis L of the total measuring transducer imaginarily connecting the two flow dividers $2_1$, $2_2$ and extending through a center of mass of the measuring transducer. In the case of tube arrangements formed by means of bent measuring tubes, the measuring tubes can, for example, be caused to oscillate, in each case, at least sectionally, in the manner of a terminally clamped cantilever, consequently thus to execute cantilever-bending oscillations around, in each case, an imaginary oscillation axis parallel to at least two of the imaginary connecting axes $Z_1$, $Z_2$, $Z_3$, $Z_4$. The measuring tubes $18_1$, $18_2$, $18_3$, $18_4$ are, furthermore, so excited by means of the exciter mechanism 5 that they are, at least partially, especially predominantly, excited to bending oscillations, which have a bending oscillation frequency, which approximately equals an instantaneous mechanical resonant frequency of the tube arrangement comprising the four measuring tubes $18_1$, $18_2$, $18_3$, $18_4$ or which lies at least in the vicinity of such a resonant frequency, or has a defined frequency separation from the resonant frequency. The instantaneous mechanical resonance frequencies of bending oscillations are, as is known, dependent, in special measure on the size, shape and material of the measuring tubes $18_1$, $18_2$, $18_3$, $18_4$, however, also on the material properties of the fluid flowing through the measuring tubes, not least of all also its instantaneous density, and can, insofar, vary during operation of the measuring transducer within a wanted-frequency band of several kilohertz. In exciting the measuring tubes to an instantaneous resonant frequency, thus, on the one hand, an average density of the fluid instantaneously flowing through the four measuring tubes can easily be ascertained based on the instantaneously excited oscillation frequency. On the other hand, so also the instantaneously electrical power required for maintaining the oscillations excited in the wanted mode can be minimized. Especially, the four measuring tubes $18_1$, $18_2$, $18_3$, $18_4$ are driven by the exciter mechanism 5 to oscillate, furthermore, at least at times, with essentially equal oscillation frequency, especially, in each case, one and the same natural mechanical eigenfrequency, insofar, a shared eigenfrequency. In advantageous manner, the oscillatory behavior of the tube arrangement formed by means of the four measuring tubes $18_1$, $18_2$, $18_3$, $18_4$, as well as also the driver signals controlling the exciter mechanism, are, furthermore, so matched to one another that at least the oscillations of the four measuring tubes $18_1$, $18_2$, $18_3$, $18_4$ excited in the wanted mode are so embodied that the first and the second measuring tubes $18_1$, $18_2$—, for instance, in the manner of two tuning fork tines—oscillate essentially opposite-equally to one another, consequently at least in the imaginary cross sectional plane XY with an opposing phase shift of, for instance, 180°, and also the third and the fourth measuring tubes $18_3$, $18_4$ oscillate equally to one another also essentially opposite-equally.

In an additional embodiment of the invention, the exciter mechanism 5 is formed by means of a first oscillation exciter $5_1$ acting, especially differentially, consequently simultaneously, and opposite-equally, on the first measuring tube $18_1$ and on the second measuring tube $18_2$. The oscillation exciter $5_1$ is, especially, adapted to excite, especially differentially and/or simultaneously, both mechanical oscillations of the first measuring tube as well as also mechanical oscillations of the second measuring tube, especially in such a manner that the oscillations of the second measuring tube are opposite-equal to the oscillations of the first measuring tube. For such purpose, the oscillation exciter $5_1$ can be formed, for example, by means of a permanent magnet held on the first measuring tube and a, cylindrical coil held on the second measuring tube and permeated by its magnetic field, for instance, in the manner of a coil, plunger arrangement, in the case of which the cylindrical coil is arranged coaxially to the permanent magnet and the magnet embodied as a plunging armature moved within the coil. Thus, the oscillation exciter can be an electrodynamic oscillation exciter. For the purpose of increasing the efficiency of the exciter mechanism, respectively for the purpose of the increasing the exciter forces generated therewith while simultaneously being of as symmetric as possible construction, the exciter mechanism comprises, according to a further development of the invention, additionally, a second oscillation exciter $5_2$, especially an electrodynamic one and/or one acting differentially on the third measuring tube $18_3$ and the fourth measuring tube $18_4$. The second oscillation exciter $5_2$ is embodied, in advantageous manner, at least of equal construction to the first oscillation exciter $5_1$, insofar as it works analogously to its principle of action, for example, thus likewise is an oscillation exciter of electrodynamic type. Especially, the second oscillation exciter $5_2$ is, furthermore, adapted to excite, especially differentially and/or simultaneously, both mechanical oscillations of the third measuring tube as well as also mechanical oscillations of the fourth measuring tube, for instance, in such a manner that the oscillations of the fourth measuring tube are opposite-equal to the oscillations of the third measuring tube and/or that the oscillations of the third and fourth measuring tubes excited by means of the second oscillation exciter are independent of the oscillations of the first and second measuring tube excited by means of the first oscillation exciter.

As indicated in FIGS. 5, 12a, and 15, and equally as well quite usual in the case of measuring transducers of the type being discussed, the sensor arrangement 19 can, furthermore, be adapted to register both inlet-side as well as also outlet-side vibrations (for example, namely bending oscillations excited by means of the exciter mechanism 5) of the measuring tubes $18_1$, $18_2$, $18_3$, respectively $18_4$ and to transduce them into corresponding oscillation signals s1, s2, so that these depend, as regards a phase difference—relative to one another and/or relative to the driver signal—on the mass flow rate. For example, the sensor arrangement 19 can be formed by means of an inlet-side, first oscillation sensor $19_1$, especially an electrodynamic one and/or one differentially registering at least oscillations of the first measuring tube $18_1$ relative to the second measuring tube $18_2$, as well as an outlet-side, second oscillation sensor $19_2$, especially an electrodynamic one and/or one differentially registering at least oscillations of the first measuring tube $18_1$ relative to the second measuring tube $18_2$, which two oscillation sensors, in each case, react to movements of the measuring tubes $18_1$, $18_2$, $18_3$, $18_4$, especially their lateral deflections and/or deformations, and deliver the first and second oscillatory signals with the above-mentioned properties and dependence on the respective measured variables. The two oscillation sensors $19_1$, $19_2$, for example, oscillation sensors constructed equally to one another, can—such as directly evident from FIG. 5 and quite usual in the case of measuring transducers of the type being discussed—are placed in the measuring transducer 11 essentially equidistantly from the first oscillation exciter $5_1$. Moreover, the oscillation sensors of the sensor arrangement 19 can be embodied at least of equal construction to the at least one oscillation exciter of the exciter mechanism 5 insofar as they work analogously to its principle of action, for example, thus are likewise of electrodynamic type. Moreover, the sensor arrangement 19 can additionally also be formed by means of further oscillation sensors, namely by means of an inlet-side, third oscillation sensor $19_3$, especially an electrodynamic one and/or one registering oscillations of the third measuring tube $18_3$ differentially relative to the fourth measuring tube $18_4$, as well as an outlet-side fourth oscillation sensor $19_4$, especially an electrodynamic one and/or one registering oscillations of the third measuring tube $18_3$ differentially relative to the fourth measuring tube $18_4$. For additionally improving signal quality, as well as also for simplifying the transmitter electronics 12 receiving the measurement signals, furthermore, the first and third oscillation sensors $19_1$, $19_3$ can be electrically interconnected serially, for example, in such a manner that a common oscillatory signal represents shared inlet-side oscillations of the first and third measuring tubes $18_1$, $18_3$ relative to the second and fourth measuring tubes $18_2$, $18_4$. Alternatively or supplementally, also the second and fourth oscillation sensors $19_2$, $19_4$ can be electrically interconnected serially in such a manner that a common oscillatory signal of the to oscillation sensors $19_2$, $19_4$ represents shared outlet-side oscillations of the first and third measuring tubes $18_1$, $18_3$ relative to the second and fourth measuring tubes $18_2$, $18_4$.

The sensor arrangement 19 can, furthermore, such as usual in the case of such measuring transducers, be coupled in suitable manner, for example, by wire via connecting lines, with a measuring circuit correspondingly provided in the transmitter electronics 12, for example, a measuring circuit formed by means of at least one microprocessor and/or by means of at least one digital signal processor. The measuring circuit can, furthermore, be adapted to receive the oscillation signals of the sensor arrangement 19 and to generate therefrom the above mentioned measured values, in given cases, also with consideration of electrical excitation power fed by means of the at least one driver signal into the exciter mechanism and converted therein, i.e. measured values, which thus can represent, for example, a mass flow rate, a totalled mass flow and/or a density and/or a viscosity of the fluid to be measured, and which, in given cases, can be displayed on-site and/or also sent in the form of digital measured data to a data processing system superordinated to the measuring system and there appropriately further processed. Furthermore, the measuring circuit, consequently the transmitter electronics formed therewith, can be provided and designed, based on electrical excitation power converted in the exciter mechanism 5, for example, periodically recurringly and/or on query, to generate the mentioned viscosity measured values representing the viscosity of the flowing fluid and/or based on the oscillation signals delivered by the measuring transducer, for example, periodically recurringly and/or on query, to generate the mentioned mass flow-measured values representing the mass flow rate of the flowing fluid and/or, for example, periodically recurringly and/or on query, to generate density-measured values representing the density of the flowing fluid. Alternatively or supplementally, the measuring circuit, respectively the transmitter electronics 12, can, furthermore, be adapted, based on oscillation signals and/or with consideration of electrical excitation power fed by means of the at least one driver signal into the exciter mechanism, consequently also power converted therein, to diagnose an instantaneous operating state of the measuring transducer, for instance to detect whether or to what extent the measuring transducer is damaged. For such purpose, additionally, such as quite usual in the case of measuring transducers of the type being discussed, supplementally to the above-mentioned oscillation sensors, other sensors can be provided in the measuring transducer, especially auxiliary sensors, for instance sensors registering disturbance variables and/or sensors correspondingly electrically connected to the transmitter electronics 12, such as e.g. acceleration sensors for registering movements of the total measuring system caused by forces and/or asymmetries in the tube arrangement, strain gages for registering expansions of one or more of the measuring tubes and/or of the transducer housing, pressure sensors for registering a static pressure reigning in the transducer housing and/or temperature sensors for registering temperatures of one or more of the measuring tubes and/or of the transducer housing, by means of which, for example, the ability of measuring transducer to function and/or changes of the sensitivity of the measuring transducer for the measured variables primarily to be registered, especially the mass flow rate and/or the density, as a result of cross sensitivities, or external disturbances, can be better monitored and, in given cases, correspondingly better compensated.

The invention claimed is:
1. A measuring transducer of the vibration-type, said measuring transducer comprising:
  a first flow divider including two tubular chambers separated from one another for guiding in- and out flowing fluid, of which chambers a first chamber includes a chamber floor, in which are formed two, mutually spaced flow openings, communicating with a lumen of the first chamber, and a second chamber includes a chamber floor, in which are formed two, mutually spaced flow openings, communicating with a lumen of the second chamber;
  a second flow divider including two tubular chambers separated from one another for guiding in- and out flowing fluid, of which chambers a first chamber includes a chamber floor, in which are formed two, mutually spaced flow openings, communicating with a lumen of said first chamber, and a second chamber includes a chamber floor, in which are formed two, mutually spaced flow openings, communicating with a lumen of the second chamber;
  a tube arrangement including at least four measuring tubes connected to said flow dividers for parallel flow, for guiding flowing fluid, of which measuring tubes:
  a first measuring tube communicates with an inlet-side, first measuring tube end with a first flow opening of the first chamber of the first flow divider and with an outlet-side, second measuring tube end with a first flow opening of the first chamber of the second flow divider,
  a second measuring tube at least sectionally parallel to the first measuring tube, communicates with an inlet-side, first measuring tube end with a second flow opening of said first chamber of said first flow divider and with an outlet-side, second measuring tube end with a second flow opening of said first chamber of the second flow divider,
  a third measuring tube communicates with an inlet-side, first measuring tube end with a first flow opening of the second chamber of said first flow divider and with an outlet-side, second measuring tube end with a first flow opening of the second chamber of said second flow divider, and
  a fourth measuring tube at least sectionally parallel to the third measuring tube, communicates with an inlet-side, first measuring tube end with a second flow opening of the second chamber of said first flow divider and with an outlet-side, second measuring tube end with a second flow opening of said second chamber of said second flow divider;
  an electromechanical exciter mechanism for exciting mechanical oscillations of said measuring tubes, and;
  a sensor arrangement for registering oscillatory movements of said measuring tubes and for generating both a first oscillation measurement signal representing oscillations of at least one of the measuring tubes and least a second oscillation measurement signal representing oscillations of at least one of said measuring tubes.

2. The measuring transducer as claimed in claim 1, wherein:
  said electromechanical exciter mechanism includes a first oscillation exciter, which is adapted to excite both mechanical oscillations of said first measuring tube as well as also mechanical oscillations of said second measuring tube, differentially and/or simultaneously, in such a manner that the oscillations of said second measuring tube are opposite-equal to the oscillations of said first measuring tube.

3. The measuring transducer as claimed in claim 2, wherein:
  said electromechanical exciter mechanism includes a second oscillation exciter, one equally-constructed to said first oscillation exciter, which is adapted to excite both mechanical oscillations of said third measuring tube as well as also mechanical oscillations of said fourth measuring tube, differentially and/or simultaneously, in such a manner that the oscillations of said fourth measuring tube are opposite-equal to the oscillations of said third measuring tube and/or that the oscillations of said third and fourth measuring tubes excited by means of said second oscillation exciter are independent of the oscillations of said first and said second measuring tube excited by means of said first oscillation exciter.

4. The measuring transducer as claimed in claim 1, wherein:
  said first flow divider includes a flange; and
  said second flow divider includes a flange.

5. The measuring transducer as claimed in claim 1, wherein:
  said flow openings formed in the chamber floor of said first chamber of said first flow divider and the flow openings formed in the chamber floor of said second chamber of said first flow divider are so arranged that:

a minimum separation between the flow openings formed in said chamber floor of said first chamber of said first flow divider equals a minimum separation between the flow openings formed in said chamber floor of said second chamber of said first flow divider; and/or a minimum separation between said first flow opening formed in the chamber floor of said first chamber of said first flow divider and said first flow opening formed in said chamber floor of the second chamber of said first flow divider equals a minimum separation between said second flow opening formed in said chamber floor of said first chamber of said first flow divider and said second flow opening formed in said chamber floor of said second chamber of said first flow divider.

6. The measuring transducer as claimed in claim 1, wherein:

the flow openings formed in the chamber floor of said first chamber of the second flow divider and the flow openings formed in the chamber floor of said second chamber of the second flow divider are so arranged that:

a minimum separation between the flow openings formed in the chamber floor of the first chamber of said second flow divider equals a minimum separation between the flow openings formed in the chamber floor of said second chamber of the second flow divider; and/or a minimum separation between the first flow opening formed in the chamber floor of said first chamber of the second flow divider and the first flow opening formed in the chamber floor of said second chamber of the second flow divider equals a minimum separation between the second flow opening formed in the chamber floor of said first chamber of the second flow divider and the second flow opening formed in the chamber floor of said second chamber of the second flow divider.

7. The measuring transducer as claimed in claim 1, further comprising:

a transducer housing, an at least partially hollow cylindrical, transducer housing, of which a first housing end is formed by means of the first flow divider and a second housing end is formed by means of the second flow divider, wherein:

said transducer housing includes a cavity, within which the tube arrangement, the exciter mechanism as well as the sensor arrangement are placed.

8. The measuring transducer as claimed in claim 7, wherein:

both the first flow divider as well as also the second flow divider are integral components of said transducer housing, in such a manner that said transducer housing includes a side wall laterally bounding the cavity and affixed both to the first flow divider as well as also to the second flow divider, connected by material bonding both with the first flow divider as well as also with the second flow divider.

9. The measuring transducer as claimed in claim 1, wherein the first flow divider comprises:

a connection nozzle extending from a proximal truncated end, namely one truncated end bordering both on an outer edge zone of the chamber floor of said associated first chamber as well as also on an outer edge zone of the chamber floor of said associated second chamber, to a distal truncated end, namely one truncated end remote both from the chamber floor of said associated first chamber as well as also from the chamber floor of said associated second chamber;

as well as a partition arranged within a lumen of said connection nozzle, said partition extending from a proximal partition end, namely one partition end bordering both on an inner edge zone of the chamber floor of said associated first chamber as well as also on an inner edge zone of the chamber floor of said associated second chamber to a distal partition end, namely one partition end remote both from the chamber floor of said first chamber as well as also from the chamber floor of said second chamber and a first lateral edge contacting said connection nozzle and a second lateral edge contacting said connection nozzle.

10. The measuring transducer as claimed in claim 9, wherein:

the partition of said first flow divider is at least sectionally warped.

11. The measuring transducer as claimed in claim 1, wherein:

the second flow divider comprises:

a connection nozzle extending from a proximal truncated end, namely one truncated end bordering both on an outer edge zone of the chamber floor of said associated first chamber as well as also on an outer edge zone of the chamber floor of said associated second chamber to a distal truncated end, namely one truncated end remote namely both from the chamber floor of said associated first chamber as well as also from the chamber floor of said associated second chamber;

as well as a partition arranged within a lumen of said connection nozzle, said partition extending from a proximal partition end, namely one partition end bordering both on an inner edge zone of the chamber floor of said associated first chamber as well as also on an inner edge zone of the chamber floor of said associated second chamber, to a distal partition end, namely one partition end remote both from the chamber floor of said first chamber as well as also from the chamber floor of said second chamber and a first lateral edge contacting said connection nozzle and a second lateral edge contacting said connection nozzle.

12. The measuring transducer as claimed in claim 11, wherein:

the partition of said second flow divider is at least sectionally warped, in such a manner that a surface facing said first chamber of the second flow divider is convex and a surface facing the second chamber of said second flow divider is concave.

13. The measuring transducer as claimed in claim 1, wherein:

said first chamber of said first flow divider is of equal construction with at least one chamber of said second flow divider; and/or said second chamber of said first flow divider is of equal construction with at least one chamber of said second flow divider.

14. The measuring transducer as claimed in claim 1, wherein:

said first chamber of said first flow divider is of equal construction with only one chamber of said second flow divider; and/or said second chamber of said first flow divider is of equal construction with only one chamber of said second flow divider.

15. The measuring transducer as claimed in claim 1, wherein:
said first chamber of said first flow divider is at least sectionally hollow cylindrical, in such a manner that the lumen of the chamber shows a plurality of imaginary cross sectional areas lying behind one another, equally as well mutually parallel and/or similar, imaginary cross sectional areas, having showing, in each case, a circular segment shaped silhouette; and/or
said second chamber of said first flow divider is at least sectionally hollow cylindrical, in such a manner that the lumen of the chamber shows a plurality of imaginary cross sectional areas lying behind one another, equally as well mutually parallel and/or similar, imaginary cross sectional areas, showing, in each case, a circular segment shaped silhouette; and/or
said first chamber of said second flow divider is at least sectionally hollow cylindrical, in such a manner that the lumen of the chamber shows a plurality of imaginary cross sectional areas lying behind one another, equally as well mutually parallel and/or similar, imaginary cross sectional areas, showing, in each case, a circular segment shaped silhouette; and/or
said second chamber of said second flow divider is at least sectionally hollow cylindrical, in such a manner that the lumen of the chamber shows a plurality of imaginary cross sectional areas lying behind one another, equally as well mutually parallel and/or similar, imaginary cross sectional areas, showing, in each case, a circular segment shaped silhouette.

16. The measuring transducer as claimed in claim 1, wherein:
each of the four measuring tubes is at least sectionally straight.

17. The measuring transducer as claimed in claim 1, wherein:
each of the four measuring tubes is at least sectionally bent, U-shaped or V-shaped.

18. The measuring transducer as claimed in claim 1, wherein:
the tube arrangement shows at least two mutually perpendicular, imaginary symmetry planes, relative to which the tube arrangement is, in each case, mirror symmetric.

19. The measuring transducer as claimed in claim 1, wherein:
the tube arrangement shows two imaginary tube planes, mutually parallel, imaginary tube planes, of which a first imaginary tube plane imaginarily cuts both the first measuring tube as well as also the third measuring tube lengthwise and a second imaginary tube plane imaginarily cuts both the second measuring tube as well as also the fourth measuring tube lengthwise, in such a manner that the first imaginary tube plane imaginarily halves both the first measuring tube as well as also the third measuring tube; and/or
that the second imaginary tube plane imaginarily halves both the third measuring tube as well as also the fourth measuring tube.

20. The measuring transducer as claimed in claim 1, wherein:
the measuring tubes are only pairwise of equal construction, in such a manner that the first measuring tube is only of equal construction to the second measuring tube and the third measuring tube is only of equal construction to the fourth measuring tube and/or
that a measuring tube length of the first measuring tube only equals a measuring tube length of the second measuring tube and a measuring tube length of the third measuring tube only equals a measuring tube length of the fourth measuring tube and/or
that a caliber of the first measuring tube only equals a caliber of the second measuring tube and a caliber of the third measuring tube only equals a caliber of the fourth measuring tube.

21. The measuring transducer as claimed in claim 1, wherein:
a caliber of the first measuring tube equals a caliber of the second measuring tube and a caliber of the third measuring tube equals a caliber of the fourth measuring tube, in such a manner that the caliber of the first measuring tube also equals the caliber of the third measuring tube, and the caliber of the second measuring tube also equals the caliber of the fourth measuring tube.

22. The measuring transducer as claimed in claim 1, wherein:
each of the measuring tubes, in each case, V shaped, measuring tubes includes, at least one bent tube segment.

23. The measuring transducer as claimed in claim 22, wherein:
the measuring tubes are so formed and arranged that the at least one bent tube segment of each of the measuring tubes is, in each case, parallel to the at least one bent tube segment of each of the other measuring tubes.

24. The measuring transducer as claimed in claim 1, wherein:
each of the measuring tubes is V-shaped and the measuring tubes are so arranged that the tube arrangement shows a V shaped silhouette.

25. The measuring transducer as claimed in claim 1, wherein:
each of the measuring tubes includes, in each case, three bent tube segments.

26. The measuring transducer as claimed in claim 25, wherein:
the measuring tubes are so formed and arranged that each of the three bent tube segments of each of the measuring tubes is, in each case, parallel to one of the three bent tube segments of each of the other measuring tubes.

27. A measuring system serving for measuring at least one physical, measured variable of a fluid flowing in a pipeline, which measuring system comprises:
a measuring transducer of the vibration-type for producing reaction forces dependent on at least one physical, measured variable of a fluid flowing in a pipeline, said measuring transducer comprising:
a first flow divider including two tubular chambers separated from one another for guiding in- and out flowing fluid, of which chambers a first chamber includes a chamber floor, in which are formed two, mutually spaced flow openings, communicating with a lumen of the first chamber, and a second chamber includes a chamber floor, in which are formed two, mutually spaced flow openings, communicating with a lumen of the second chamber;
a second flow divider including two tubular chambers separated from one another for guiding in- and out flowing fluid, of which chambers a first chamber includes a chamber floor, in which are formed two, mutually spaced flow openings, communicating with a lumen of said first chamber, and a second chamber includes a chamber floor, in which are formed two, mutually spaced flow openings, communicating with a lumen of the second chamber;

a tube arrangement including at least four measuring tubes connected to said flow dividers for parallel flow, for guiding flowing fluid, of which measuring tubes:

a first measuring tube communicates with an inlet-side, first measuring tube end with a first flow opening of the first chamber of the first flow divider and with an outlet-side, second measuring tube end with a first flow opening of the first chamber of the second flow divider, a second measuring tube at least sectionally parallel to the first measuring tube, communicates with an inlet-side, first measuring tube end with a second flow opening of said first chamber of said first flow divider and with an outlet-side, second measuring tube end with a second flow opening of said first chamber of the second flow divider, a third measuring tube communicates with an inlet-side, first measuring tube end with a first flow opening of the second chamber of said first flow divider and with an outlet-side, second measuring tube end with a first flow opening of the second chamber of said second flow divider, and a fourth measuring tube at least sectionally parallel to the third measuring tube, communicates with an inlet-side, first measuring tube end with a second flow opening of the second chamber of said first flow divider and with an outlet-side, second measuring tube end with a second flow opening of said second chamber of said second flow divider;

an electromechanical exciter mechanism for exciting mechanical oscillations of said measuring tubes;

a sensor arrangement for registering oscillatory movements of said measuring tubes and for generating both a first oscillation measurement signal representing oscillations of at least one of the measuring tubes and least a second oscillation measurement signal representing oscillations of at least one of said measuring tubes; and a transmitter electronics electrically connected with the measuring transducer for activating the exciter mechanism of the measuring transducer and for processing at least one of the oscillation measurement signals generated by the sensor arrangement of the measuring transducer.

* * * * *